(12) United States Patent
Van Erlach et al.

(10) Patent No.: US 12,243,074 B2
(45) Date of Patent: *Mar. 4, 2025

(54) ELECTRONICALLY GENERATED PROMOTIONAL STRUCTURE DEPLOYMENT

(71) Applicant: FabFitFun, Inc., Los Angeles, CA (US)

(72) Inventors: Julian Van Erlach, Walnut, CA (US); Andreas Andrea, Los Angeles, CA (US)

(73) Assignee: FABFITFUN, INC., Los Angeles, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 17/973,614

(22) Filed: Oct. 26, 2022

(65) Prior Publication Data

US 2023/0130848 A1  Apr. 27, 2023

Related U.S. Application Data

(63) Continuation-in-part of application No. 17/899,972, filed on Aug. 31, 2022, now Pat. No. 11,699,170, (Continued)

(51) Int. Cl.
*G06Q 30/02* (2023.01)
*G06K 1/12* (2006.01)
(Continued)

(52) U.S. Cl.
CPC ......... *G06Q 30/0255* (2013.01); *G06K 1/121* (2013.01); *G06K 19/0723* (2013.01);
(Continued)

(58) Field of Classification Search
CPC ........... G06Q 30/0255; G06Q 10/0833; G06Q 10/0838; G06Q 30/0201; G06Q 30/0269;
(Continued)

(56) References Cited

U.S. PATENT DOCUMENTS 8,175,908 B1   5/2012  Anderson
8,371,502 B1 * 2/2013  Galit ...................... G06Q 30/02
                                              235/487
(Continued)

FOREIGN PATENT DOCUMENTS

AU    2013329003 A1 * 6/2015 ............. G06Q 10/08
WO  WO 2008/076832 A2   6/2008
(Continued)

OTHER PUBLICATIONS

S. Purnama; U. Rhardja; Q. Aini; A. Khoirunisa; R. A. Toyibah, Approaching The Anonymous Deployment of Blockchain-Based Fair Advertising On Vehicle Networks (English), 2021 3rd International Conference on Cybernetics and Intelligent System (ICORIS) (2021, pp. 1-6), Oct. 25, 2021 (Year: 2021).*
(Continued)

*Primary Examiner* — Marilyn G Macasiano
(74) *Attorney, Agent, or Firm* — Schmeiser, Olsen & Watts, LLP

(57) ABSTRACT

A server, method, and computer program product for implementing electronically generated promotion deployment is provided. Package shipments being shipped from a client to at least one recipient recipient are detected. A promotional placement request associated with promotions with respect to attributes of the at least one recipient is received within a data structure. Promotional attributes from the client with the at least one recipient are cross referenced with respect to the received promotional placement request. At least one visible promotional structure associated with the promotional attributes is electronically generated. The at least one visible promotional structure is deployed during a real time delivery process of at least one package to the at least one recipient.

31 Claims, 10 Drawing Sheets

Related U.S. Application Data which is a continuation of application No. 17/451,840, filed on Oct. 22, 2021, now Pat. No. 11,468,473.

(51) Int. Cl.
| | |
|---|---|
| *G06K 19/07* | (2006.01) |
| *G06Q 10/083* | (2023.01) |
| *G06Q 10/0833* | (2023.01) |
| *G06Q 30/0201* | (2023.01) |
| *G06Q 30/0251* | (2023.01) |
| *G06Q 30/0273* | (2023.01) |
| *G09F 3/00* | (2006.01) |
| *G06Q 10/087* | (2023.01) |
| *G06Q 30/0241* | (2023.01) |

(52) U.S. Cl.
CPC ..... *G06Q 10/0833* (2013.01); *G06Q 10/0838* (2013.01); *G06Q 30/0201* (2013.01); *G06Q 30/0269* (2013.01); *G06Q 30/0275* (2013.01); *G09F 3/0297* (2013.01); *G06Q 10/087* (2013.01); *G06Q 30/0276* (2013.01)

(58) Field of Classification Search
CPC ............. G06Q 30/0275; G06Q 10/087; G06Q 30/0276; G06Q 30/0254; G06Q 10/067; G06Q 30/0246; G06Q 30/02; G06Q 30/0207; G06K 1/121; G06K 19/0723; G09F 3/0297
See application file for complete search history.

(56) References Cited

U.S. PATENT DOCUMENTS

| | | | | |
|---|---|---|---|---|
| 10,121,167 | B2 | 11/2018 | Deshpande et al. | |
| 10,417,669 | B2 | 9/2019 | Ho | |
| 10,425,674 | B2 | 9/2019 | Kitts et al. | |
| 10,867,319 | B1 * | 12/2020 | Snitselaar | G06Q 30/0269 |
| 11,080,751 | B1 * | 8/2021 | Parolini | G06Q 30/0261 |
| 11,468,473 | B1 | 10/2022 | Van Erlach | |
| 2002/0042744 | A1 * | 4/2002 | Kohl | G06Q 30/0258 705/14.56 |
| 2002/0124253 | A1 | 9/2002 | Eyer et al. | |
| 2008/0010137 | A1 * | 1/2008 | Ho | G06Q 30/0274 705/14.69 |
| 2008/0126146 | A1 * | 5/2008 | Benveniste | G06Q 30/0242 705/14.68 |
| 2009/0177524 | A1 | 7/2009 | An | |
| 2010/0265535 | A1 | 10/2010 | Friedman et al. | |
| 2012/0042025 | A1 * | 2/2012 | Jamison | G06Q 30/0242 709/206 |
| 2012/0047010 | A1 | 2/2012 | Dowling et al. | |
| 2012/0176649 | A1 * | 7/2012 | Giordano | G06Q 30/00 358/1.18 |
| 2013/0073400 | A1 * | 3/2013 | Heath | G06Q 50/01 715/738 |
| 2013/0346156 | A1 | 12/2013 | Ho | |
| 2014/0104626 | A1 * | 4/2014 | Giordano | G06Q 30/0255 358/1.6 |
| 2015/0019384 | A1 | 1/2015 | Fabian et al. | |
| 2018/0181955 | A1 * | 6/2018 | Woods | G06Q 20/3821 |
| 2018/0221244 | A1 * | 8/2018 | Joplin | B65B 61/20 |
| 2019/0340566 | A1 * | 11/2019 | Gillen | G06Q 30/0251 |
| 2021/0344742 | A1 | 11/2021 | Du | |
| 2022/0101377 | A1 | 3/2022 | Bose et al. | |

FOREIGN PATENT DOCUMENTS

| | | | | |
|---|---|---|---|---|
| WO | WO 2014/059329 A2 * | 4/2014 | | G06Q 10/08 |
| WO | WO 2020/168077 A1 * | 8/2020 | | G06T 11/60 |

OTHER PUBLICATIONS

S. Kurkovsky, Using principles of pervasive computing to design m-commerce applications (English), International Conference on Information Technology: Coding and Computing (ITCC'05)—vol. II (vol. 2, 2005, pp. 59-64 vol. 2), Jan. 1, 2005 (Year: 2005).*

International Search Report (ISR) and Written Opinion, International filing date: Oct. 18, 2022, International application No. PCT/US2022/046937, 14 pages.

Amazon seller central; Expiration dates on FBA products; https://sellercentral.amazon.com/gp/help/external/G201003420?language=en_US; retrieved from the Internet Oct. 18, 2021; 6 pages.

U.S. Appl. No. 17/451,840, filed Oct. 22, 2021.

Office Action dated Apr. 6, 2022, U.S. Appl. No. 17/451,840, filed Oct. 22, 2021.

Amendment filed May 16, 2022, U.S. Appl. No. 17/451,840, filed Oct. 22, 2021.

Final Office Action dated Jun. 2, 2022, U.S. Appl. No. 17/451,840, filed Oct. 22, 2021.

RCE and amendment filed Jul. 20, 2022, U.S. Appl. No. 17/451,840, filed Oct. 22, 2021.

Notice of Allowance dated Aug. 18, 2022, U.S. Appl. No. 17/451,840, filed Oct. 22, 2021.

U.S. Appl. No. 17/899,972, filed Aug. 31, 2022.

Purio et al., Development of the System and Method for Delivery using Radio Frequency Identification (I-Box), Electronics Engineering Department, Adamson University, Manila, Philippines, 978-1-5090-2597-8/16, 2016 IEEE, 6 pages.

Enhanced Services for Manufacturers and Partners: Supply Chain Management Tools Offering Visibility, Tracking, and Payment Services, IP.com, IP.com No. IPCOM000191159D, Publication Date: Dec. 19, 2009, 14 pages.

Final office action dated Mar. 13, 2023, U.S. Appl. No. 17/899,972, filed Aug. 31, 2022.

R. Dedrick, A consumption model for targeted electronic advertising (English), IEEE MultiMedia (vol. 2, Issue 2, pp. 41-49), Sep. 18, 1995, 2 pages (U.S. Appl. No. 17/899,972, Final Office Action dated Mar. 13, 2023—related case).

* cited by examiner

ELECTRONICALLY GENERATED PROMOTIONAL STRUCTURE DEPLOYMENT

CROSS REFERENCE TO RELATED APPLICATIONS

This application is a continuation in part application claiming priority to Ser. No. 17/899,972 filed Aug. 31, 2022, the contents of which are hereby incorporated by reference in its entirety, which is a continuation of, and claiming priority to, Ser. No. 17/451,840 filed Oct. 22, 2021, and issued Oct. 11, 2022, U.S. Pat. No. 11,468,473.

BACKGROUND

The present invention relates generally to a method for configuring and deploying an electronically generated promotional structure and in particular to a method and associated system for improving software implemented promotional structure generation technology associated with receiving electronic data comprising shipment identification data for a shipment of an item, authorizing a shipping client associated with freight carrier to generate visible promotional structures associated with specified packages, and generating and presenting a physical or digital visible promotional structure associated with the package for delivery or a demographic profile of a package recipient. Typical current promotional practices include generating a promotion or purchase suggestion presented on a shopping Webpage of a shopping platform. The promotion or purchase suggestion is typically generated based on purchase history of a shopper. Typically, the aforementioned processes use a single source of data for generating a promotion and may be prone to inaccurate results with respect to a promotional type for presentation to a package recipient. Therefore, the method and associated system of the present invention is configured to enable a process for generating and presenting a physical or digital visible promotional structure associated with a package for delivery associated with a package recipient demographic profile thereby improving desired demographic targeting of delivery enhanced promotions.

SUMMARY

A first aspect of the invention provides a server of a freight carrier entity comprising a processor coupled to a computer-readable memory unit, the memory unit comprising: instructions that when executed by the processor implements an electronically generated promotion configuration and deployment method comprising: detecting, by the processor, package shipments previously shipped, or currently being shipped, from a client hardware system of a client to at least one recipient, said client hardware system being located external to the server; receiving, by the processor from a promotional client entity, a promotional placement request associated with promotions with respect to recipient attributes of the at least one recipient within a data structure that includes a digital representation of electronic data comprising at least one device identification attribute associated with a hardware device of the at least one recipient, and at least one profile the least one recipient, wherein the at least one each profile comprises shipment identification data for the package shipments, a recipient name and address for the at least one recipient, and description data associated with the package shipments; cross referencing with respect to the received promotional placement request, by the processor, promotional attributes from the client with the at least one recipient; electronically generating via a communications protocol over a data network, by the processor for the client with respect to the at least recipient, at least one visible promotional structure associated with the promotional attributes; and deploying, by the processor to the at least one recipient, the at least one visible promotional structure during a real time delivery process of at least one package to the at least one recipient.

Some embodiments of the invention further enable the server to deploy the at least one visible promotional structure by: printing a structure comprising the at least one visible promotional structure; and further deploying the structure with the at least one package during the real time delivery process of the at least one package to the at least one recipient. The structure may be deployed as an independent structure with respect to the at least one package during the real time delivery process of the at least one package to the at least one recipient. Likewise, some embodiments of the invention further enable the server to deploy the at least one visible promotional structure by: receiving, by the processor the at least one recipient, approval for transmitting promotional structures; generating, in response to receiving the approval, an email comprising the at least one visible promotional structure; and transmitting the email to the at least one recipient before, during, or subsequent to the real time delivery process of the at least one package. Furthermore, the description data associated with the item may be comprised by a specialized structure selected from the group consisting of a bar code structure, a universal product number (UPC) structure, stock keeping unit (SKU) code structure, and a radio frequency identification (RFID) structure. These embodiments advantageously provide an effective means for accurately enabling freight carriers to coordinate promotional capabilities with product shippers and additional clients with respect to current and prior profiled recipients of product orders thereby improving cross promotional capabilities associated with tracking and delivery hardware and software systems.

A second aspect of the invention provides an electronically generated promotion configuration and deployment method comprising: detecting, by a processor of a server of a freight carrier entity, package shipments previously shipped, or currently being shipped, from a client hardware system of a client to at least one recipient, said client hardware system being located external to the server; receiving, by the processor from a promotional client entity, a promotional placement request associated with promotions with respect to recipient attributes of the at least one recipient within a data structure that includes a digital representation of electronic data comprising at least one device identification attribute associated with a hardware device of the at least one recipient and at least one profile for the least one recipient, wherein the at least one profile comprises shipment identification data for the package shipments, a recipient name and address for the at least one recipient, and description data associated with the package shipments; cross referencing with respect to the received promotional placement request, by the processor, promotional attributes from the client with the at least one recipient; electronically generating via a communications protocol over a data network, by the processor for the client with respect to the at least one recipient, at least one visible promotional structure associated with the promotional attributes; and deploying, by the processor to the at least one recipient, the at least one visible promotional structure during a real time delivery process of at least one package to the at least one recipient.

Some embodiments of the invention further provide a process to deploy the at least one visible promotional structure by: printing a structure comprising the at least one visible promotional structure; and further deploying the structure with the at least one package during the real time delivery process of the at least one package to the at least one recipient. The structure may be deployed as an independent structure with respect to the at least one package during the real time delivery process of the at least one package to the at least one recipient. Likewise, some embodiments of the invention further enable the server to deploy the at least one visible promotional structure by: receiving, by the processor the at least one recipient, approval for transmitting promotional structures; generating, in response to receiving the approval, an email comprising the at least one visible promotional structure; and transmitting the email to the at least one recipient before, during, or subsequent to the real time delivery process of the at least one package. Furthermore, the description data associated with the item may be comprised by a specialized structure selected from the group consisting of a bar code structure, a universal product number (UPC) structure, stock keeping unit (SKU) code structure, and a radio frequency identification (RFID) structure. These embodiments advantageously provide an effective means for accurately enabling freight carriers to coordinate promotional capabilities with product shippers and additional clients with respect to current and prior profiled recipients of product orders thereby improving cross promotional capabilities associated with tracking and delivery hardware and software systems.

A third aspect of the invention provides a server of a freight carrier entity comprising a processor coupled to a computer-readable memory unit, the memory unit comprising instructions that when executed by the processor implements an electronically generated promotion configuration and deployment method comprising: detecting, by the processor from a client hardware system of a client, a notification specifying package shipments available for at least one recipient, said client hardware system being located external to the server; transmitting to authorized promotional client entities, by the processor via a communications protocol over a data network of promotional client entity hardware systems located external to the server and the client hardware system, at least one profile configured as a digital representation of electronic data, wherein the at least one profile comprises shipment identification data for the package shipments, a recipient name and address for the at least one recipient, and description data associated with the package shipments; receiving from at least one promotional client entity of the authorized promotional client entities, by the processor via the communications protocol, digital promotional structures cross-referenced to the at least one profile of the least one recipient; linking, by the processor, the digital promotional structures to a data structure comprising executable instructions embedded within computer code and the digital representation of electronic data; continuously updating, by the processor, the computer code of the data structure; electronically generating via the communications protocol, by the processor for the client with respect to the at one least one recipient, at least one visible promotional structure associated with the digital promotional structures; and deploying in real time, by the processor, the at least one visible promotional structure to the client such that the client is enabled to physically or digitally deploy the at least one visible promotional structure to the at least one recipient.

Some embodiments of the invention further allow the at least one visible promotional structure deployment to enable the client to physically or digitally deploy the at least one visible promotional structure by: printing a physical packing slip comprising the at least one visible promotional structure and a contents listing for the at least one package; and placing the physical packing slip with the at least one package for deployment during the real time delivery process of the at least one package to the at least one recipient. Alternatively, some embodiments of the invention further allow the at least one visible promotional structure deployment to enable the client to physically or digitally deploy the at least one visible promotional structure by: generating a digital packing slip comprising the at least one visible promotional structure and a contents listing for the at least one package; and transmitting the digital packing slip to the at least one recipient before, during, or subsequent to a real time delivery process of the at least one package. Likewise, some embodiments of the invention alternatively allow the at least one visible promotional structure deployment to enable the client to physically or digitally deploy the at least one visible promotional structure by: generating an electronic shipping notification comprising the at least one visible promotional structure; and transmitting the electronic shipping notification to the at least one recipient before, during, or subsequent to a real time delivery process of the at least one package. Furthermore, the description data associated with the item may be comprised by a specialized structure selected from the group consisting of a bar code structure, a universal product number (UPC) structure, stock keeping unit (SKU) code structure, and a radio frequency identification (RFID) structure. These embodiments advantageously provide an effective means for accurately enabling freight carriers to coordinate promotional capabilities with product shippers and additional clients with respect to current and prior profiled recipients of product orders thereby improving cross promotional capabilities associated with tracking and delivery hardware and software systems.

A fourth aspect of the invention provides an electronically generated promotion configuration and deployment method comprising: detecting, by a processor of a server of a freight carrier entity from a client hardware system of a client, a notification specifying package shipments available for at least one recipient, said client hardware system being located external to the server; transmitting to authorized promotional client entities, by the processor via a communications protocol over a data network of promotional client entity hardware systems located external to the server and the client hardware system, at least one profile configured as a digital representation of electronic data, wherein the at least one profile comprises shipment identification data for the package shipments, a recipient name and address for the at least one recipient, and description data associated with the package shipments; receiving from at least one promotional client entity of the authorized promotional client entities, by the processor via the communications protocol, digital promotional structures cross-referenced to the at least one profile of the least one recipient; linking, by the processor, the digital promotional structures to a data structure comprising executable instructions embedded within computer code and the digital representation of electronic data; continuously updating, by the processor, the computer code of the data structure; electronically generating via the communications protocol, by the processor for the client with respect to the at one least recipient, at least one visible promotional structure associated with the digital promotional structures; and deploying in real time, by the processor, the at least one visible promotional structure to the client such that the client is enabled to physically or digitally deploy the at least one visible promotional structure to the at least one recipient.

Some embodiments of the invention enable a process to allow the at least one visible promotional structure deployment to enable the client to physically or digitally deploy the at least one visible promotional structure by: printing a physical packing slip comprising the at least one visible promotional structure and a contents listing for the at least one package; and placing the physical packing slip with the at least one package for deployment during the real time delivery process of the at least one package to the at least one recipient. Alternatively, some embodiments of the invention further allow the at least one visible promotional structure deployment to enable the client to physically or digitally deploy the at least one visible promotional structure by: generating a digital packing slip comprising the at least one visible promotional structure and a contents listing for the at least one package; and transmitting the digital packing slip to the at least one recipient before, during, or subsequent to a real time delivery process of the at least one package. Likewise, some embodiments of the invention alternatively allow the at least one visible promotional structure deployment to enable the client to physically or digitally deploy the at least one visible promotional structure by: generating an electronic shipping notification comprising the at least one visible promotional structure; and transmitting the electronic shipping notification to the at least one recipient before, during, or subsequent to a real time delivery process of the at least one package. Furthermore, the description data associated with the item may be comprised by a specialized structure selected from the group consisting of a bar code structure, a universal product number (UPC) structure, stock keeping unit (SKU) code structure, and a radio frequency identification (RFID) structure. These embodiments advantageously provide an effective means for accurately enabling freight carriers to coordinate promotional capabilities with product shippers and additional clients with respect to current and prior profiled recipients of product orders thereby improving cross promotional capabilities associated with tracking and delivery hardware and software systems.

A sixth aspect of the invention provides an electronically generated promotion configuration and deployment method, an associated computer program product, and an associated server of a freight carrier entity comprising a processor coupled to a computer-readable memory unit, the memory unit comprising: instructions that when executed by the processor implements the electronically generated promotion configuration and deployment method which comprises: associating an identifier (ID) of a mobile device of at least one recipient to a data structure; receiving, by the processor from a promotional client entity, a promotional placement request associated with promotions with respect to recipient attributes of the at least one recipient within the data structure, wherein the data structure includes a digital representation of electronic data comprising the mobile device ID of the at least one recipient and at least one profile of the least one recipient, and wherein the at least one each profile comprises a name and address of the at least one recipient cross referencing with respect to the received promotional placement request, by the processor, promotional attributes from the client with the at least one recipient electronically generating via a communications protocol over a data network, by the processor for the client with respect to the at least recipient, at least one visible promotional structure associated with the promotional attributes; and deploying, by the processor to the mobile device of the at least one recipient in real time, the at least one visible promotional structure, wherein the at least one visible promotional structure is visible on the mobile device of the at least one recipient.

A further embodiment enables serving of advertisements ("ads") based on the location of the recipient or locations the recipient frequents, using carrier apps tracking the location of a user device, to devices used by recipients including mobile devices. The carrier may leverage the demographic data structures associated with recipients based on receipt activity and merge data in the demographic data structures with data obtained from mobile devices used by package recipients. This data obtained from mobile devices used by package recipients could be obtained from code on aps in the mobile devices used by the package recipients. Such data may include, inter alia, current and past locations of the user device and associated frequency of appearance of the user device in the current and past locations; and which locations could also be associated with geo-coded establishment locations that recipients have been in. Such data could indicate user shopping preferences and times and seasons of such preferences. Ambient data may be added to the recipient-related data structure such as client, weather and regional item type preferences by recipients with profiles deemed similar by one or more parameters.

Local establishments may wish to promote goods and services to the demographics of carrier recipients who are or have been within a certain region of those establishments. The demographic and location-related data of carrier recipient customers could be cross-referenced to desired demographic and location data by local goods and services providers; thus enabling targeted promotions to be directed to such carrier recipient customers The data collection and promotion activity may be on an opt-in basis by carrier app users.

A further embodiment may be the carrier platform provision for the ability of recipients to form communities based on local package and content receipts trends, and being able to identify via carrier platform tools, other recipients with similar shopping interest or companies or items most shopped in a region.

A further embodiment may cross reference social media posts and engagement of carrier recipients as a component of demographic data structure composition.

In a further embodiment, an app tracks what product type a device user is looking at on a shopping platform (e.g., Amazon®) and serve competing product ads via popup on the carrier ad if allowed.

In a further embodiment, ads are served on tracking pages, in status emails, and/or on apps tracking the location of a user device, without using recipient demographics and/or authorization of the advertiser by the shipper.

In a further embodiment, ads are served into any tracking page or status email sent with no targeting based on recipient demographics or authorization.

In a further embodiment, ads are provided to a shipper to place in package physically, on packing slip or digitally via email and/or digital packing slip.

In a further embodiment, the present invention provides a recipient community platform of common interests and local data of what is bought, most popular companies, etc. (e.g. digital neighborhoods).

The present invention advantageously provides a simple method and associated system capable of automating configuration and deployment of an electronically generated promotional structure.

DETAILED DESCRIPTION

Figure 1A:
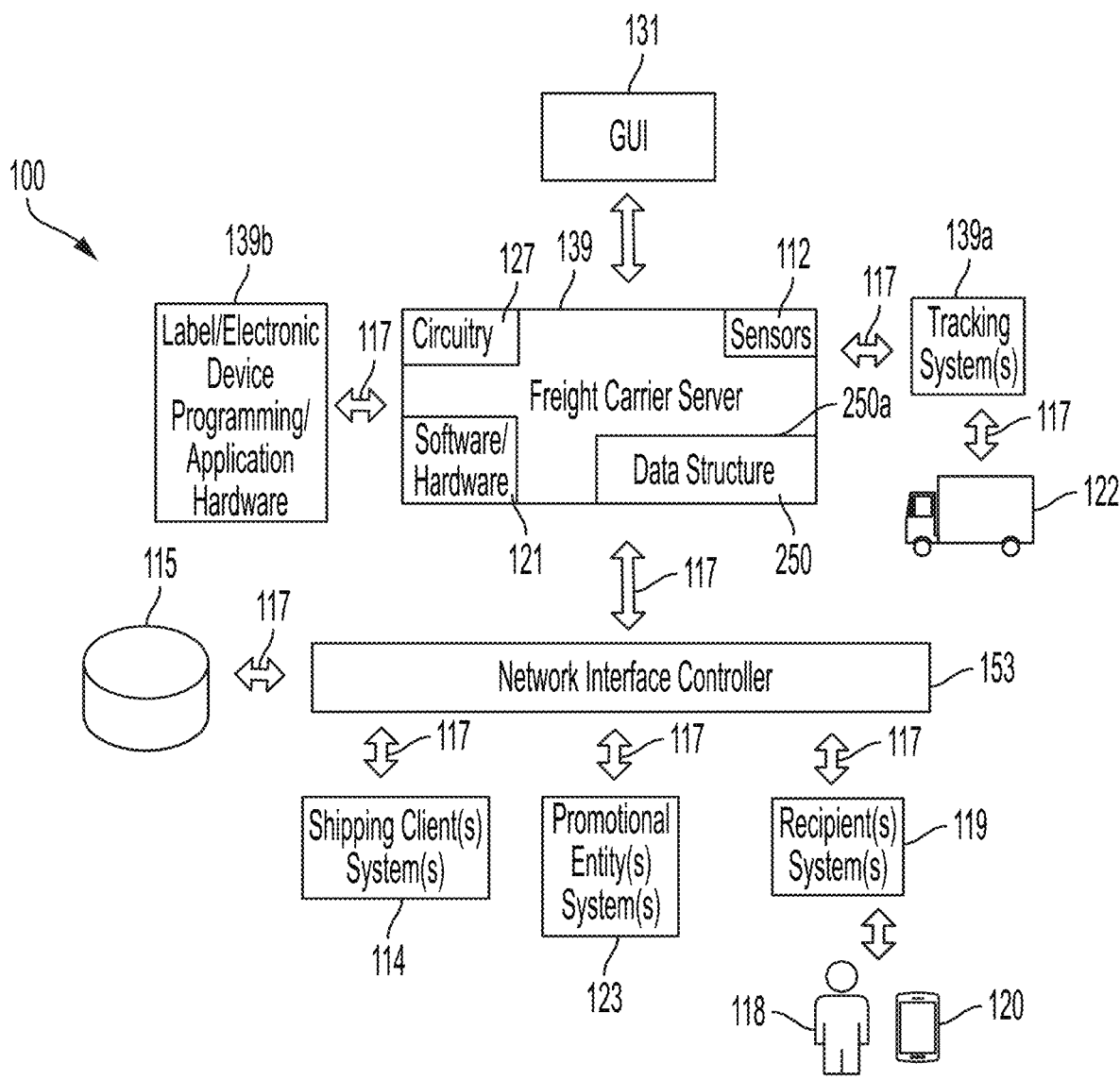
FIG. 1A illustrates a system for improving software implemented promotional structure generation technology associated with receiving electronic data comprising shipment identification data for a shipment of an item, authorizing a shipping client associated with freight carrier to generate visible promotional structures associated with specified packages, and generating and presenting a physical or digital visible promotional structure associated with the package for delivery or a demographic profile of a package recipient, in accordance with embodiments of the present invention.

FIG. 1A illustrates a system 100 for improving software implemented promotional structure generation technology associated with receiving electronic data comprising shipment identification data for a shipment of an item, authorizing a shipping client associated with freight carrier to generate visible promotional structures associated with specified packages, and generating and presenting a physical or digital visible promotional structure associated with the package for delivery or a demographic profile of a package recipient, in accordance with embodiments of the present invention. Typical advertising systems are associated with selecting a targeted advertisement based on a consumer advertising profile. Likewise, targeted information may be retrieved via usage of a personal information database and personal order sheets associated with previous orders of a user. Furthermore, typical processes for generating targeted advertisements may include methods for scanning an entire package to determine contents and generating promotions for placement on the package based on the scanned contents thereby potentially providing inaccurate results with respect to a promotional type for presentation to a package recipient. Therefore, the method and associated system of the present invention is configured to enable a process for generating and presenting a physical or digital visible promotional structure associated the package for delivery (during a real time delivery process being executed during a current time frame) thereby improving an accuracy of delivery based promotions.

System 100 enables freight carriers to determine shipment order contents and build complex customer demographic profiles. Likewise, system 100 enables freight carrier clients to opt into a shipment order content system for specifying items being shipped in each order with respect to item/package recipients thereby enabling a freight carrier to generate recipient demographics and cross-promotional opportunities.

System 100 is configured to enable a process for allowing a freight carrier customer (i.e., a shipping client) to provide item descriptions (e.g., via a sku barcode, etc.) and/or categories of products (within a package) being sent to a freight carrier for shipping to a recipient. In response, the freight carrier may build a demographic profile of package recipients with respect to products received from multiple freight carrier customers. Subsequently, the freight carrier may cross-reference products (within a package) with respect to a package identifier (e.g., a bar code) and/or a package recipient name and/or address. The freight carrier may retrieve and accumulate shipment information and associate the shipment information with a recipient name and/or address.

System 100 further enables a freight carrier customer to permit additionally selected freight carrier customers to associate promotional offers to multiple shipped orders or to permit freight carrier-served digital promotions to digital contacts of profiled recipients of a shipping customer. The additionally selected freight carrier customers are enabled to present promotions to package recipients specified within the demographic profiles (as describe, supra). Likewise, the freight carrier may attach a physical and/or digital (e.g., QR code, bar code, RFID tag, etc.) label (comprising the promotional offer) to a package comprising order contents. Additionally, the freight carrier may and may host the promotional offer digitally on an order tracking page. System 100 may further enable multi-vendor shopping platform operators or digital ecommerce wallet operators in addition to freight carriers. A digital ecommerce wallet operator may comprise an e-commerce checkout platform that retains an online shopper identity associated with a created account. The e-commerce checkout platform may allow a shopper to execute an online purchase with one enabling click across all member merchants (Instead of signing in to each individual merchant). Likewise, e-commerce checkout platform may be enabled to track online item selection and cart contents from each merchant. A digital ecommerce wallet operator may be configured to collect items selected by shoppers (or shopper shopping cart item contents) and perform promotion generation and presentation via digitally served offers to profiled shoppers.

System 100 of FIG. 1A includes a freight carrier server 139, a tracking system 139a (communicating with a shipping vehicle 122), programming/application hardware 139b, shipping client systems 114, promotional entity systems 123, (package) recipient systems 119, a database 115, and network interface controller 153 interconnected through a network 7. Freight carrier server 139, tracking system 139a, and promotional entity systems 123 are each independent from and located external to each other. For example, each of freight carrier server 139, tracking system 139a, and promotional entity systems 123 may be located at differing geographical locations. Freight carrier server 139 comprises sensors 112, circuitry/logic 127, a specialized graphical user interface (GUI) 131 (performing specialized presentation functionality associated with presentation of data of data structure 250 for analysis and computer code programming/modification), software/hardware 121, and at least one specialized memory structure 250a for storing computer program comprising a data structure 250 described with reference to FIG. 1B, infra.

Figure 1B:
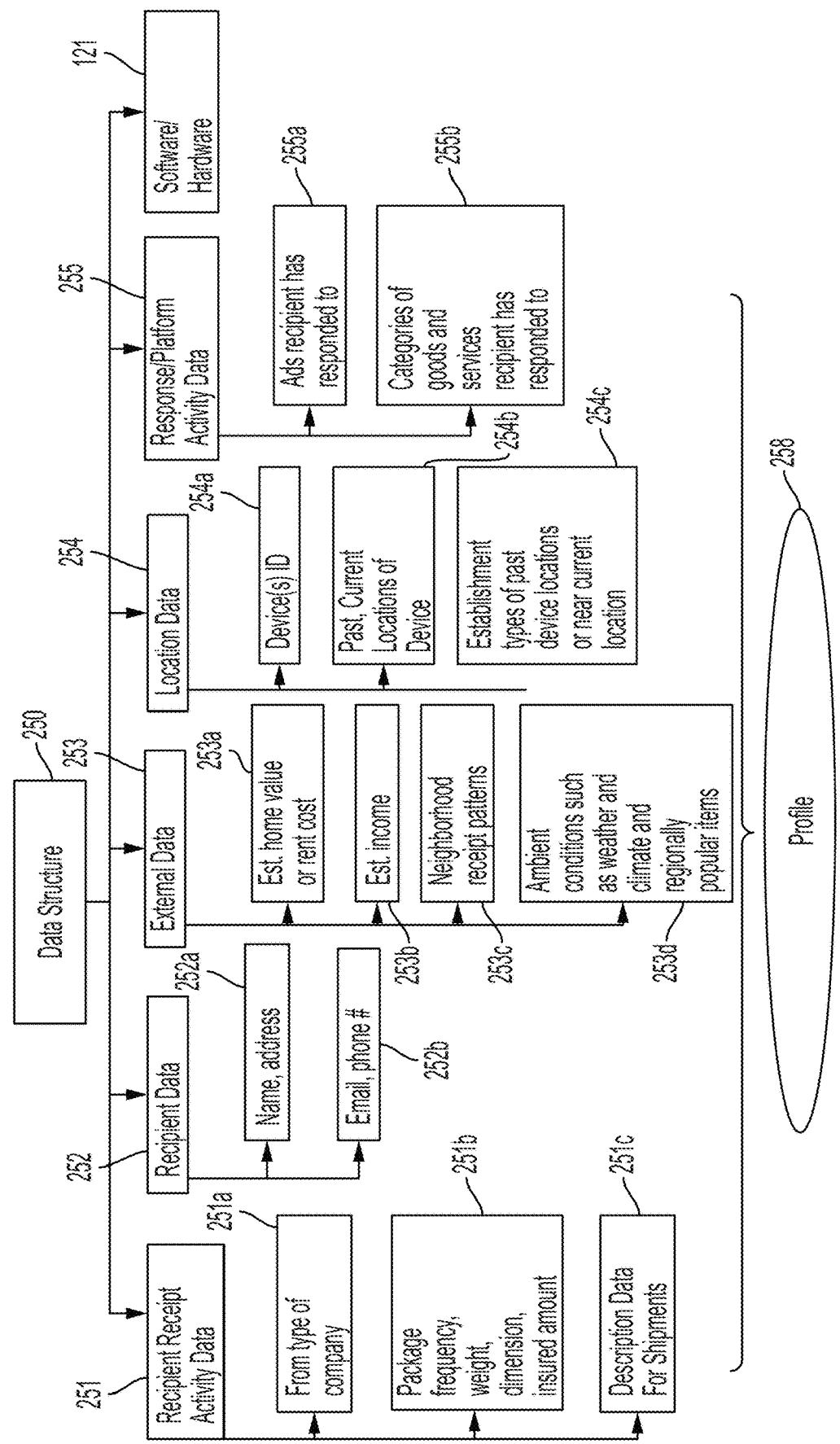
FIG. 1B illustrates an exploded view of the data structure 250 of FIG. 1A, in accordance with embodiments of the present invention.

In a first embodiment, the data structure 250 and the software/hardware 121 are separated from each other as depicted in FIG. 1A. In a second embodiment, the data structure 250 encompasses the software/hardware 121 of FIG. 1A as depicted in FIG. 1B described infra. Thus in the preceding second embodiment, the content of the software/hardware 121 resides within the data structure 250.

Programming/application hardware 139b comprises a hardware/software structure configured to generate a promotional label (e.g., a visible promotional label, a UPC label, a SKU label, etc.) and/or program an electrical device (e.g., an RFID tag) for presenting (visibly or electronically via e.g., a mobile device) a promotion to a package recipient. Likewise, programming/application hardware 139b comprises a hardware/software structure configured to apply (e.g., automatically via a robotic device) a promotional label (e.g., a visible promotional label, a UPC label, a SKU label, etc.) and/or an electrical device for presenting a promotion to a package recipient. Freight carrier server 139, tracking system 139a, programming/application hardware 139b, shipping client systems 114, promotional entity systems 123, and recipient systems 119 each may comprise an embedded device(s). An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, freight carrier server 139, tracking system 139a, programming/application hardware 139b, shipping client systems 114, promotional entity systems 123, and recipient systems 119 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-7. The specialized discrete non-generic analog, digital, and logic-based circuitry (e.g., sensors 112, circuitry/logic 127, software/hardware 121, etc.) may include proprietary specially designed components (e.g., a specialized integrated circuit, such as for example an Application Specific Integrated Circuit (ASIC) designed for only implementing an automated process for improving software implemented promotional structure generation technology associated with receiving electronic data comprising shipment identification data for a shipment of an item, authorizing a shipping client associated with freight carrier to generate visible promotional structures associated with specified packages, and generating and presenting a physical or digital visible promotional structure associated the package for delivery. Sensors 112 may include any type of internal or external sensors including, inter alia, GPS sensors, Bluetooth beaconing sensors, cellular telephone detection sensors, Wi-Fi positioning detection sensors, triangulation detection sensors, activity tracking sensors, a temperature sensor, an ultrasonic sensor, an optical sensor, a video retrieval device, humidity sensors, voltage sensors, network traffic sensors, etc. Delivery vehicle 122 may include a memory system, software, video recording devices (e.g., a video camera), and motion control hardware (all sensors and associated control hardware for executing a process for directing delivery vehicle 122 to deliver a package to a specified location). Vehicle 122 may comprise any type of vehicle that includes a human operator located within vehicle 122 (e.g., an aircraft, an automobile or truck, a boat or ship, a train, etc.) for enabling a package delivery process. Alternatively, vehicle 122 may comprise any vehicle that does not require a human operator to be located within the vehicle 122 such as, inter alia, a remote controlled vehicle (e.g., an aircraft flown by a pilot at a ground control station), an autonomously controlled vehicle (e.g., an aircraft controlled based on pre-programmed flight plans and may include an intelligence algorithm that would enable a vehicle to know it's location and self-determine a route to deliver a package to a location dynamically), a pre-programmed vehicle, etc. Vehicle 122 may include, inter alia, an aerial vehicle, a land-based vehicle, a marine (water) based vehicle, etc. Vehicle 122 may include sensors (within vehicle 122) including, inter alia, GPS sensors, temperature sensors, pressure sensors, cameras, infrared sensors, motion sensors, a microphone, optical sensors, a thermal imaging apparatus/sensor, optical and vibrational sensors, voltage sensors, RFID sensors, etc. Network 7 may include any type of network including, inter alia, a local area network, (LAN), a wide area network (WAN), the Internet, a wireless network, etc.

System 100 is enabled to execute a process for generating a printed or electronic structure for presenting a promotion as follows:

The process is initiated when a freight carrier receives (from a first shipping client via an opt-in interface) electronic data (associated with a package comprising products for shipment) including shipment IDs, package recipient names and addresses, and data indicating contents of packages (e.g., retrieved via an item bar code, a UPC, a sku structure, an item description, a category, etc.). Subsequently, the electronic data is utilized for generating a demographic profile for each package recipient. Additionally, an interface is presented (to the first shipping client) for enabling or disabling additional shipping clients to generate and present promotions on a package or associated shipment tracking page of the first shipping client. A subsequent cross-referencing process may be executed as follows:

The associated shipment tracking page is cross referenced with (shipping client enabled) additional shipping clients enabled to present a promotion via a tracking page associated with a demographic of a package recipient associated with the tracking page. Likewise, available tracking pages are matched with a number of promotions desired by additional shipping clients with respect to matched package recipient demographics. A bidding process may be enabled with respect to selecting the additional shipping clients such that a relationship between a desired number of promotions exceeds available shipment tracking pages with respect to a specified interval of time. In response to the aforementioned cross-referencing, a specified shipping client is enabled to present promotions on an associated tracking Webpage. The cross-referencing process results in the generation of a promotion (e.g., in the form of a label comprising the promotion in a visible format, a QR code for communications with and promotion presentation to a mobile device of a package recipient, an RFID tag for communications with and promotion presentation to a mobile device of a package recipient, etc.) for placement on a package or an associated tracking page of the first customer.

System 100 additionally enables the following functionality:

1. Enabling a shipping client (e.g., via a specialized interface such as, inter alia, specialized hardware/software, a virtual reality interface, mobile device interface, etc.) to enter shipping package contents and/or item value (of shipping package contents) in combination with order/shipment data for generating a package recipient(s) profile.
2. Enabling a freight carrier to present promotion based on information within a package recipient(s) profile (via digital communications such as, inter alia, email, text message, encrypted digital communications, etc.). Likewise, a freight carrier is enabled to present promotions via package recipient communications (e.g., email, phone communications, etc.). Likewise, a freight carrier may be enabled to offer promotion placement to promotional entities unrelated to current freight carrier package shipments.
3. Enabling a reverse bidding process (initiated by shipping clients) to retrieve additional promotions and associated revenue such that a current supply of desired profiled recipients is greater than a demand for promotions (e.g., multiple shipping clients are associated with pending package recipients comprising similar profiles exceeding a promotion demand.
4. Shipping clients are enabled to provide recipient demographics for promotion presentation with respect to freight carrier generated package recipient demographics associated with multiple orders received by package recipients.
5. Shipping clients are enabled to select promotional entities for placement of promotions on packages or associated package tracking Webpages of a freight carrier(s) independent from whether a promotional entity comprises a shipping customer of the freight carrier presenting promotions. The freight carrier may select desired promotion placement with respect to authorized combinations of shipping clients associated with in-transit packages and promotional entities.
6. Enabling recipient profiling based on elements such as, inter alia, a category of package recipient purchases, a frequency of package recipient purchases, a value of package recipient purchases, an estimated home value of package recipients, an estimated income of package recipients, address data of package recipients, time series and rate of change data associated with package recipients, responses of package recipients with respect to previous promotions, specific types, quantities, or combinations of items or categories of items purchases/received over time, responses to previous freight carrier digital promotions unrelated to current package shipments, etc.

System 100 is configured to deploy an electronically generated promotional structure as described in the following example process scenario:

The process is initiated when a freight carrier (e.g., a parcel service, a government postal service, etc.) builds and enables a hardware/software platform (e.g., freight carrier server 139, tracking system 139*a*, and programming/application hardware 139*b* of FIG. 1A). Shipping clients A, B, and C (e.g., entities providing products for shipment to package recipients) are enabled to opt in (with the freight carrier) to provide the hardware/software platform with data describing item contents for each shipment being sent via the freight carrier. For example, shipping clients A, B, and C may opt in to provide (via a specialized computer interface application programming interface (API)) order identification data (for each shipment) such as, inter alia, an order number, a package recipient(s) name and address, item contents within each order including an item number, a universal product code (UPC), a product description, and a product category for each item.

In response, the freight carrier utilizes the order identification data to build package recipient profiles comprising items received (by the package recipient(s)) and/or package recipient addresses with respect to multiple orders executed via multiple shipper clients (e.g., shipping clients A, B, and C). Associated profiles (for the multiple shipping clients) may further include order weight(s), order dimensions, an estimated residence value of a package recipient(s), an estimated income of a package recipient(s), etc. An algorithm (implemented via specialized software code) may be enabled to generate profiles for package recipients with respect to, inter alia, product types received, a frequency of product receipt, categories of products received, a breadth and depth (i.e., volume) of items received across multiple categories, a number of shippers from which various product categories are received, etc.

The freight carrier may further enable shipping clients A, B, and C to allow alternative shipping clients to generate and apply promotional structures (e.g., a visible promotional label, a UPC label, a SKU label, etc. and/or an electrical device (e.g., an RFID tag) for presenting (visibly or electronically via e.g., a mobile device)) to packages of shipping clients A, B, and C. Likewise, the freight carrier may further enable shipping clients A, B, and C to allow the alternative shipping clients to generate promotions for presentation via Web based tracking pages for the packages or within email (e.g., confirmation email) or SMS (phone texts or messages) transmitted to recipients via the freight carrier. The freight carrier hardware/software platform may comprise and enable specialized filters for allowing shipping client A, B, and C to enable or disable promotions with respect to a name of a company or industry. Therefore (for any given package in transit by any given company), a number of additional companies may be enabled to promote in association with a package.

The freight carrier may further generate software programming code executed for matching desired package recipient demographics comprising potential promotional entities to available demographics of package recipients of in-transit packages. Furthermore, the potential promotional entities may require that promotional structures only be placed on packages of package recipients that are not current or past customers of the freight carrier. The aforementioned process may be executed by enabling the potential promotional entities to provide names and addresses to the freight carrier or by enabling the freight carrier to exclude package recipients of package shipments from the potential promotional entities by querying its own delivery archives. A subsequent matching process may be executed to compare an aggregate demand by package recipient profile type from multiple potential promotional entities to an available supply of promotions. Likewise, a bidding process may be executed to match a demand and supply of promotions. The bidding process may comprise a tiered process with respect to a relative association with any given package recipient profile. That association may comprise a function of breadth and depth of package recipient activity across desired product types or categories over time. Alternatively, association may comprise a function of a promotion response history tracked by the freight carrier hardware/software platform. A matching and bidding process may be further executed to target with respect to a promotion on a package or a digital promotion on a tracking Web page, etc.

When a promotion is matched to a package recipient, the hardware/software platform is enabled to monitor packages (for delivery) with desired promotions applied physically to the packages (e.g., via a physical promotion applicator such as programming/application hardware 139b) and directing the physical promotion applicator to apply the promotion to the package. Additionally, the hardware/software platform may be enabled to present desired promotions to: Web tracking pages of package orders in-transit to the targeted package recipients and/or in delivery confirmation emails, texts, or alternative digital means.

The hardware/software platform may further be enabled to: track promotion related behavior of package recipients; charge fees per type of promotion, and/or may enable revenue-sharing agreements with shipping clients allowing promotions. Associated data retrieved during the aforementioned process may enable additional services such as, inter alia, provisioning item or category aggregate demand data by geographic area, shipping client scoring capability for recipients, a recipient community based on a similarity of demand (e.g., recipients receiving similar categories of items), etc.

Shipping clients may additionally be provided with data describing a degree associated with any combination of shippers sharing recipient profiles or a degree to which shipping clients retain desired demographic recipient profiles of alternative shipping clients.

System 100 is configured to further deploy an electronically (e.g., via specialized hardware and software implemented circuitry of e.g., label/electronic device programming/application hardware 139b) generated promotional structure as described in the following process scenario:

A freight carrier (without approval from a shipping entity) enables a process for printing (via electronic hardware or software means such as specialized hardware or software printing apparatuses, software electronic document structures such as a PDF file, etc.) promotional offers associated with a package recipient demographic and physically delivers the printed promotional offers during package delivery (i.e., the freight carrier does not apply the printed promotional offers to the package. System 100 enables the following process associated with physically delivering printed promotional offers during package delivery:

The process is initiated when a freight carrier generates package recipient profiles as described, supra. Likewise, a shipping client may contact the freight carrier for promotional structure generation and placement. In response, the freight carrier generates (e.g., prints) promotional structures (e.g., flyers) that are unique for specific package recipients associated with a shipping client's desired profile for the promotional structures. Subsequently, promotional structures are delivered to the package recipient during a package delivery process executed by the freight carrier. The aforementioned process does not require any type of authorization from the shipping entity thereby enabling a physical promotional structure to be printed for association with a data structure configured to a package recipient address.

System 100 is configured to further deploy an electronically generated promotional structure as described in the following alternative process scenario:

A freight carrier enables a process for providing shipping client/entity approved promotional structures from additional shipping client/entities. The promotional structures are provided to a package recipient via a physical or digital packing slip or a package status email transmitted from the original shipping client/entity thereby leveraging demographic profiles generated by the freight carrier entity with respect to promotions associated with the additional shipping client/entities (i.e., using the original shipping client/entity infrastructure). System 100 enables the following process associated with providing the promotional offers prior to, during, or subsequent to package delivery:

The process is initiated when a freight carrier system matches an authorized promotional entity to a shipping client/entity and package recipient such that the shipping client/entity system transmits a message comprising pending shipments to the freight carrier carrier system. The message may include, inter alia, a recipient address and associated tracking numbers. In response, the freight carrier transmits authorized promotional structures (generated based on package recipient demographics matched to a physical address associated with a tracking number and desired demographics of the package recipient) to the shipping client/entity. Subsequently, the shipping client/entity is enabled to print a promotional structure a packing slip or insert in the promotional structure within a package. Alternatively, the shipping client/entity is enabled to deploy the promotional structure digitally within an electronic shipment notification or digital packing slip transmitted to a package recipient.

FIG. 1B illustrates an exploded view of the data structure 250 of FIG. 1A, in accordance with embodiments of the present invention. In a first embodiment, the data structure 250 and the software/hardware 121 are separated from each other as depicted in FIG. 1A. In a second embodiment, the data structure 250 encompasses the software/hardware 121 of FIG. 1A as depicted in FIG. 1B. Thus in the preceding second embodiment, the content of the software/hardware 121 resides within the data structure 250.

Figure 2A:
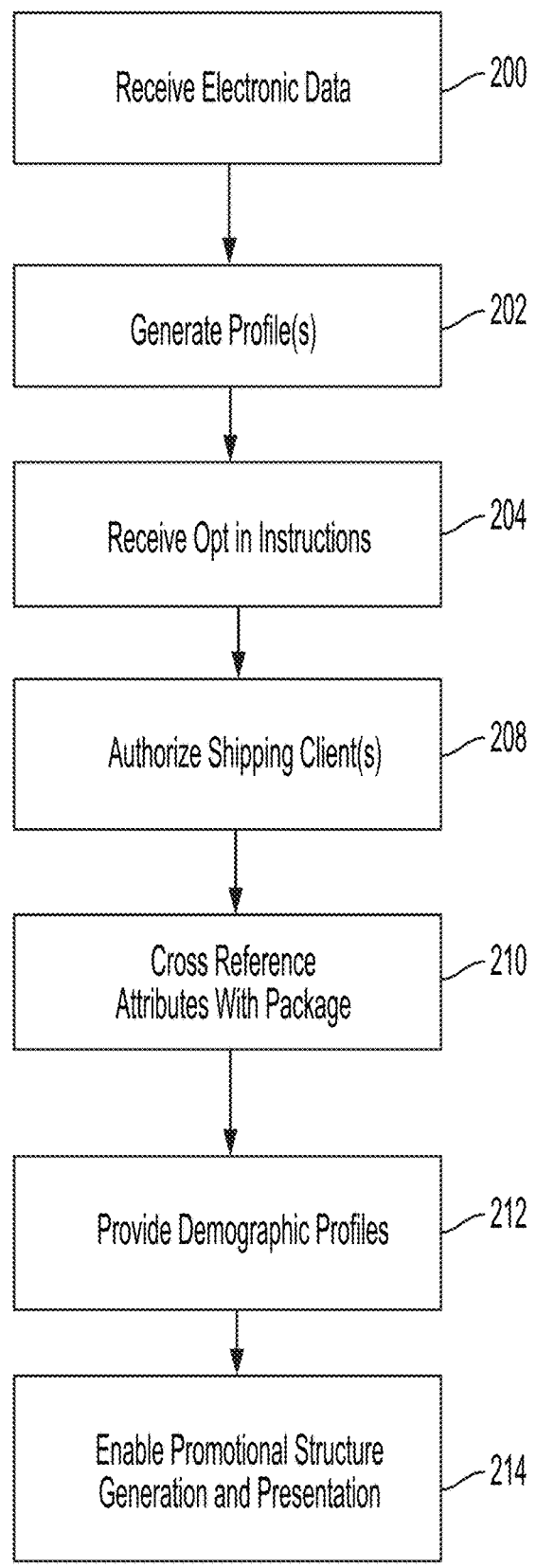
FIG. 2A illustrates an algorithm detailing a process flow enabled by the system of FIG. 1A for improving software implemented promotional structure generation technology associated with receiving electronic data comprising shipment identification data for a shipment of an item, authorizing a shipping client associated with freight carrier to generate visible promotional structures associated with specified packages, and generating and presenting a physical or digital visible promotional structure associated with the package for delivery or a demographic profile of a package recipient, in accordance with embodiments of the present invention.
Figure 2B:
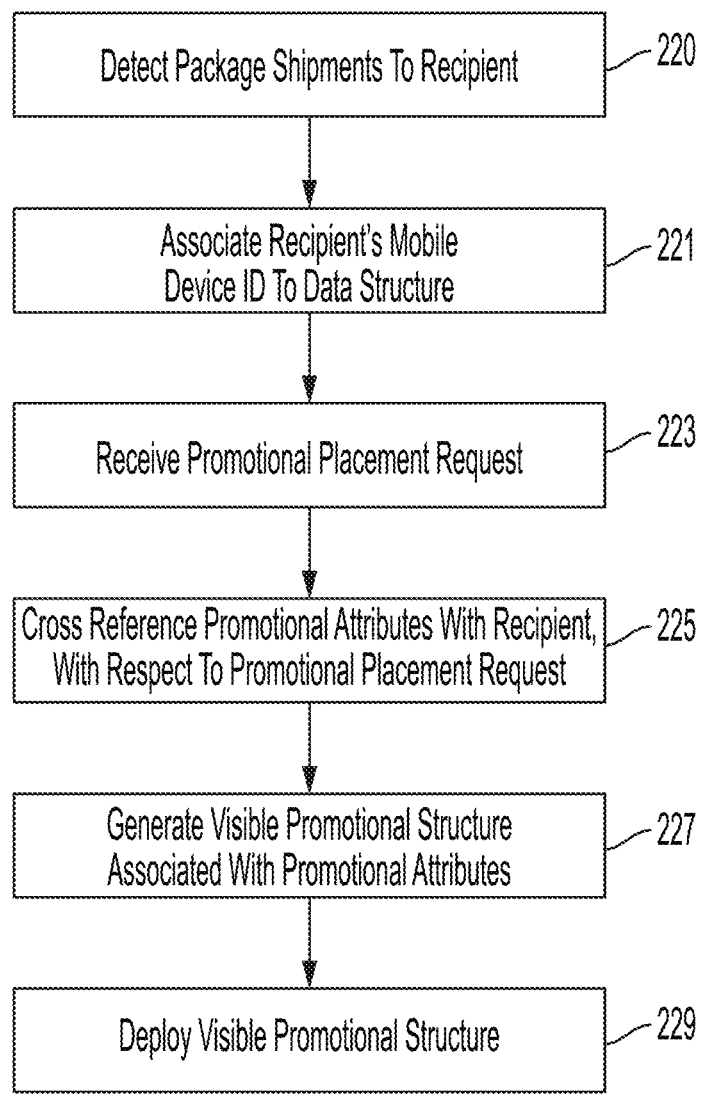
FIG. 2B illustrates a first alternative algorithm detailing a process flow enabled by the system of FIG. 1A for improving software implemented promotional structure generation technology associated with and generating and deploying a physical or digital visible promotional structure associated with the package for delivery or a demographic profile of a package recipient, in accordance with embodiments of the present invention.
Figure 2C:
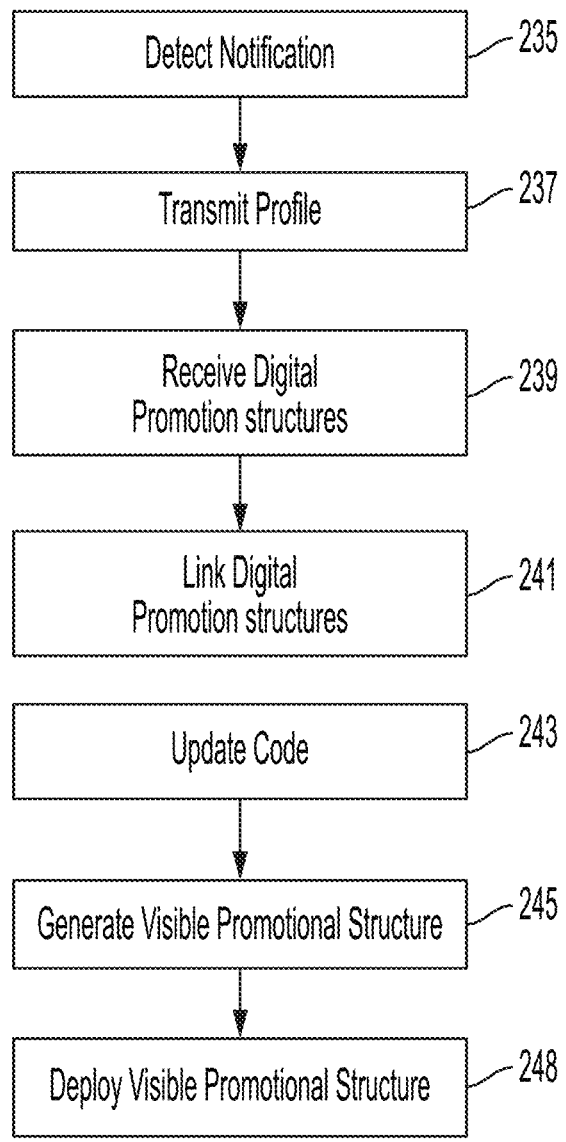
FIG. 2C illustrates a second alternative algorithm detailing a process flow enabled by the system of FIG. 1A for improving software implemented promotional structure generation technology associated with and generating and deploying a physical or digital visible promotional structure associated with the package for delivery or a demographic profile of a package recipient, in accordance with embodiments of the present invention.

Software/hardware 121 comprises specialized computer code, and associated data, created and updated by a modifiable computer program product comprising specialized instructions executable for generating and deploying a physical or digital promotional structure for a package recipient in accordance with the steps of FIGS. 2A-2C. Software/hardware 121 comprises a plurality of specialized modifiable (based on execution and feedback from freight carrier server 139 of FIG. 1A) computer code modules executable for automated detection of package shipments and generating (i.e., constructing) and deploying a physical or digital promotional structure for a package recipient. Software/hardware 121 comprises an instruction set for modifying an operation and functionality of software/hardware of freight carrier server 139 of FIG. 1A. Modifying an operation and functionality of software/hardware of freight carrier server 139 comprises updating and modifying code of code modules based on feedback from system 100 of FIG. 1A. The updated and modified code of code modules operationally modifies a functionality of freight carrier server 139.

Data structure 250 comprises at least one profile 258 comprising data items (e.g., relating to the recipient of a package). Each profile of the at least one profile 258 includes data items grouped under categories of: recipient receipt activity data 251, recipient data 252, external data 253, location data 254, and response/platform activity data 255.

Receipt activity data 251 includes the following data items: a type of company from which the package originated 251a; package frequency (of being sent), package weight, package dimensions, and insured amount of package content 251b; and description data associated with the package shipments (e.g., description of package content; shipment identification data for the package shipments) 251c. The description data 251c may also include a bar code structure, a universal product number (UPC) structure, stock keeping unit (SKU) code structure, and a radio frequency identification (RFID) structure.

Recipient data 252 includes the following data items: name and address of recipient 252a; and email address and phone number (landline or cell phone) of recipient 252b.

External data 253 includes the following data items: estimated home value or rental cost 253a; estimated income 253b; neighborhood receipt patterns 253c; and ambient conditions such as weather, climate, and regionally popular items 253d.

Location data 254 includes the following data items: an identification (ID) of one or more user device(s) 254a; past and/or current locations of device 254b, and establishment types of past device locations or near past and/or current locations 254c. In one embodiment, the one or more user device(s) 254a includes one or more mobile devices.

Response platform activity data 255 includes data items of: ads that recipient has responded to 255a and categories of goods and services that recipient has responded to (e.g., via shopping and/or purchasing) 255b.

An algorithm (executed via computer code) may act upon data structure 250 (one or more times) to ascribe a demographic attribute (executed via any of code modules) to data structure 250 which attribution is a function of archived shipment-related data and rules (executed via code modules) that derive one or more demographic attributes that are associated with data structure 250. A demographic attribution algorithm may be executed for deriving a gender, an income level, a home value level associated with a package recipient address, and consumption preferences associated with categories of items received, a frequency of receipt, combinations of items received, seasonal patterns of such receipts, and additional aspects that may be derived from receipt data.

A specialized computer program (e.g., software/hardware of 121 of FIG. 1A or FIG. 1B) may be generated for matching demographic attributes of data structures associated with parcel recipients to locate relevant commonalties among promotional entity-desired attribute combinations and those of package recipients. Demographic attributes may include, inter alia, income levels and propensities to consume certain types of goods or combinations of goods.

Data structure 250 may additionally comprise an archive of inventory items/lots and an archive of orders. The archive of inventory items/lots comprises (for each item/lot), an item ID, quantity, serving days, and expiration.

In some embodiments, the data structure 250 associates the archive of inventory items/lots with the archive of orders. In some embodiments, the archive of orders comprises, for each customer/store order, an order ID, a physical order, and the digital packing slip of the order ID.

In some embodiments, the computer program product (e.g., software/hardware of 121 of FIG. 1A) encodes data structure 250 (via execution of code module) with a value comprising a result of subtracting from a lot expiration date, a reference date, such as the difference between the expiration date of each lot and a reference date, the difference between the time difference and the serving days. In some embodiments, data structure 250 includes an encoded value comprising the result of subtracting from an order receipt date by a recipient and/or further subtracting the consumption days of the item. The computer program product creates and continuously updates/modifies a new data structure 250 (via execution of code modules) at a predetermined frequency (e.g., after each time or day).

In some embodiments, data structure 250 can be extended to mapping to a GUI or an email containing an item and price offer to a customer and mapping the email to an electronic item purchase order specifying a minimum expiration date of a lot of an ordered item. For example, data structure 250, through a sequence of programs, may cause a marketing and promotions program to display a price offer associated to an item archived in the data structure 250 via a GUI. Similarly, data structure 250 causes, through a series of programs, an electronic purchase order to specify an earliest acceptable lot expiration date.

A communication module (e.g., of data structure 250 and/or software/hardware of 121) may be configured to receive and store information pertaining to each item or lot in an inventory from data structure 250. Data structure 250 maintains information of each item or lot including but not limited to:

Item or product description
SKU number
Lot number
Number of available pieces of an item or product of each lot in an inventory
Inventory pick locations
Quantity by location of inventory for each item or product
Expiration date (or expiry) of each lot
Servings units per container of each item or product
Recommended daily dose
Days of servings (serving units divided by recommended daily dose)
Historic rates of sale of units of an item or product regardless of lot
Current orders or open orders for an item or product
Sales forecast or rate of sale (number of items sold per day)
Expected receipt dates for an item or product
Likewise, one or more processors (of freight carrier server 139 of FIG. 1A) may run a computer program executing steps for calculating days of sales of an entire inventory and/or an effective expiry similar to those described above, at intervals or continuously based on received item information from data structure 250.

In some embodiments, an expiry validation program performs, via the processors, a reversed calculation, i.e., the difference of serving days and days to expiry. After the calculation, the processors record the results in data structure 250 for future execution.

FIG. 2A illustrates an algorithm detailing a process flow enabled by system 100 of FIG. 1A for improving software implemented promotional structure generation technology associated with receiving electronic data comprising shipment identification data for a shipment of an item, authorizing a shipping client associated with freight carrier to generate visible promotional structures associated with specified packages, and generating and presenting a physical or digital visible promotional structure associated the package for delivery or a demographic profile of a package recipient, in accordance with embodiments of the present invention. Each of the steps in the algorithm of FIG. 2A may be enabled and executed in any order by a computer processor(s) executing computer code. Additionally, each of the steps in the algorithm of FIG. 2A may be enabled and executed in combination by freight carrier server 139, tracking system 139a, programming/application hardware 139b, shipping client systems 114, promotional entity systems 123, and recipient systems 119. In step 200, electronic data is received by a server of a freight carrier. The electronic data may be received from the freight carrier entity. The electronic data may be received from the freight carrier from a portal system(s) of the freight carrier. The portal system may include item order information associated with packages for package recipients or a carrier-operated imaging system configured to determine item attributes within a sealed package. The electronic data includes shipment identification data for a shipment of an item(s) from a shipping client(s) to a package recipient(s); a recipient name and address for the package recipient(s), and description data associated with the item(s). The description data may be comprised by a structure such as, inter alia, a bar code structure, a universal product number (UPC) structure, a stock keeping unit (SKU) code structure, a radio frequency identification (RFID) structure, etc.

In step 202, a profile(s) is generated for the package recipient(s) based on the electronic data retrieved in step 200. The profile may include data associated with a type of company of the shipping client(s), specified types of products associated with the shipping client(s), a size of packages received by the recipient(s), a weight of packages received by the the recipient(s).

In step 204, opt in instructions are received from the shipping client(s) via an interface (e.g., a hardware/software interface, a virtual interface, etc.). The opt in instructions may include permission for enabling an additional shipping client(s) (of the freight carrier) to generate promotions in association with packages being delivered by the freight carrier. The opt in instructions may further include permission enabling at least one additional shipping client of the freight carrier to generate promotions in association with the package(s).

In step 208, additional shipping clients (of the freight carrier) are authorized to generate visible promotional structures associated with specified packages for delivery by the freight carrier. In step 210, promotional attributes from the additional shipping clients are cross referenced (based on results of step 208 and in response to analysis of the profile(s)) with the package(s) comprising the item(s) for the recipient(s). The cross-referencing process may include matching demographic profiles (of further recipients of pending delivery packages) to additional demographic profiles selected by at least one authorized promotional entity from at least one further shipping client for each pending delivery package. In step 212, the demographic profiles and additional demographic profiles are presented (or provided to) the shipping client(s) and the at least one further shipping client. In step 214, (at least one) visible promotional structure associated with the promotional attributes is generated for the recipients. The visible promotional structure may include a physical structure attached to the package(s) and/or a digital structure configured to be presented to the recipient(s) via a hardware and software user interface. The visible promotional structure may be presented to the recipient(s) during a delivery process of the package(s) or in a digital form at any time after the package recipient has been profiled. Additionally, a plurality of item recipients and a plurality of different freight carrier entities may be authorized (in response to instructions from the freight carrier entity) to generate and present additional visible promotional structures associated with further specified packages for delivery by the freight carrier to different recipients receiving shipped orders from the freight carrier entity. Additionally, entities (associated with further shipping clients) may be authorized to provide the visible promotional structure to a profiled package recipient(s) associated with the further shipping clients and associated Web-based tracking pages. Demographics of the profiled package recipient(s) are provided by the further shipping clients.

Generating the visible promotional structure may include any combination of the following processes:

Generating the visible promotional structure may include enabling a Web-based tracking page associated with the package(s) for allowing the at least one further shipping client to promote a demographic associated with the recipient(s) via the Web-based tracking page. Likewise, additional authorized Web-based tracking pages for packages may be matched to a number of promotional structures associated with the at least one further shipping client with respect to the demographic of the recipient(s). A resulting bidding process may be enabled. The bidding process is enabled for the shipping clients and the least one further shipping client with respect to visible promotional placement with respect to the package(s) such that a number of promotional structures in combination with visible promotional structure(s) promotions exceeds a number of available Web-based tracking pages associated with the freight carrier over a given interval of time. Presenting the visible promotional structure may include presentation via the Web-based tracking page for tracking a vehicle associated with delivery of the package(s). The Web-based tracking page may include a static tracking page for providing static type tracking information for tracking the vehicle associated with delivery of the package(s). Alternatively, the Web-based tracking page may include a dynamic tracking page for providing dynamic real time continuously updating tracking information for the package(s). The visible promotional structure may include multiple differing promotions presented to the recipient(s) based on differing real-time locations of the vehicle associated with delivery of the package(s). The multiple differing promotions are associated with businesses located near to the differing real-time locations of the vehicle. Additionally, geographical information associated with the businesses may be retrieved from a database of known locations. The geographical information associated with the businesses may be detected via sensors of the vehicle as the vehicle is moving past the businesses.

Generating the visible promotional structure may include generating at least one label comprising a visible promotion for presentation to the recipient(s). Likewise, presenting the visible promotional structure may include applying the at least one label to the package(s). Applying the at least one label to the package(s) may include, inter alia, a manual process performed by a person, an automated process performed by a machine (e.g., a robotic device).

Generating the visible promotional structure may include generating at least one label comprising a QR code associated with a visible promotion for presentation to the recipient(s). Presenting the visible promotional structure includes enabling communications between the QR code and a mobile device(s) of recipient(s) such that the mobile device(s) present visible promotion to the recipient(s).

Generating the visible promotional structure may include generating data associated with a visible promotion for presentation to the recipient(s) and transferring the data to a RFID tag(s). Likewise, presenting the visible promotional structure may include applying the the RFID tag(s) to the package(s) and enabling communications between the RFID tag(s) and a mobile device(s) of the recipient(s) such that the mobile device(s) presents the visible promotion to the recipient(s).

FIG. 2B illustrates a first alternative algorithm detailing a process flow enabled by the system of FIG. 1A for improving software implemented promotional structure generation technology associated with and generating and deploying a physical or digital visible promotional structure associated with the package for delivery or a demographic profile of a package recipient, in accordance with embodiments of the present invention. Each of the steps in the algorithm of FIG. 2B may be enabled and executed in any order by a computer processor(s) executing computer code. Additionally, each of the steps in the algorithm of FIG. 2B may be enabled and executed in combination by freight carrier server 139, tracking system 139a, programming/application hardware 139b, GUI 131, shipping client systems 114, promotional entity systems 123, and recipient systems 119. FIG. 2B describes multiple embodiments comprising execution of step 220 and/or step 221. Such embodiments encompass executing step 220, executing step 221, or executing step 220 and step 221.

In step 220, package shipments are detected. The package shipments were previously shipped, or are currently being shipped, from a client hardware system 114 of a client to at least one recipient in recipient systems 119. The client hardware system 114 is located external to the server 139. Package shipments may be detected via data detection processes associated with monitoring data within data structure 250 of FIG. 1A or FIG. 1B, or being transmitted across network 117. Alternatively, package shipments may be detected via usage of hardware/software sensors being activated during communication between freight carrier server 139 and packages of the package shipments. For example, package shipments may comprise sensors (e.g., RFID or NFC sensors) communicating with circuitry of the freight carrier server during processing and travel of the packages.

In step 221, an identifier (ID) of a mobile device of at least one recipient is associated to the data structure 250. In one embodiment, the mobile device ID of the at least one recipient is included within item 254a of the data structure 250. In one embodiment, the address of at least one recipient may be associated to the mobile device ID of the at least one recipient.

The data structure 250 of FIG. 1B) is executed with respect to (data identifying) the recipient (e.g., via a cross-referencing process). The data structure may include a digital representation of electronic data comprising a profile for the recipient. The profile may comprise information including: shipment identification data for the package shipments, a recipient name and address for the recipient, and description data associated with the package shipments. The description data associated with the item is comprised by a specialized structure that may include a bar code structure, a universal product number (UPC) structure, stock keeping unit (SKU) code structure, and a radio frequency identification (RFID) structure.

In step 223, a promotional placement request is received from a promotional client entity 123. The promotional placement request is associated with promotions with respect to attributes of the at least one recipient within the data structure 250 that includes a digital representation of electronic data comprising at least one device identification attribute associated with a hardware device (e.g., mobile device in one embodiment) 254a of the at least one recipient and at least one profile 258 for the least one recipient. The at least one profile 258 is depicted in FIG. 1B and comprises a recipient name and address 252a for the at least one recipient, past and/or current locations 254b of the hardware device (e.g., mobile device in one embodiment) of the at least one recipient, and description data for shipments associated with the package shipments 251c (e.g., description of package content; shipment identification data for the package shipments). The description data 251c may also include a bar code structure, a universal product number (UPC) structure, stock keeping unit (SKU) code structure, and a radio frequency identification (RFID) structure.

In step 225, promotional attributes from the client with the at least one recipient are cross referenced with respect to the received promotional placement request.

In step 227, at least one visible promotional structure associated with the promotional attributes is electronically generated (e.g., via specialized hardware and software code) for the client with respect to the recipient. In one embodiment, electronically generating the at least one visible promotional structure is based on any one or more data items in the data structure. For example, the one or more data items in the data structure, upon which said electronically generating the at least one visible promotional structure is based, comprises inter alia: a past and/or current location of the mobile device, one or more advertisements that the at least one recipient has responded to, one or more categories of goods and services that the at least one recipient has responded to, the address of the at least recipient, the email of the at least recipient, an estimated home value or rental cost of the at least one recipient, an income of the at least one recipient, and combinations thereof.

In step 229, the at least one visible promotional structure is deployed to the recipient during a real time delivery process of the package. The deployment process may include: printing a structure comprising the at least one visible promotional structure; and further deploying the structure with the package during the real time (a current time of the delivery process) delivery process of the package to the recipient. The structure may be deployed as an independent structure with respect to the package (i.e., not attached to the package) during the real time delivery process the package to the recipient.

In one embodiment of step 229, the at least one visible promotional structure may be deployed by being transmitted to a mobile device of the at least one recipient in real time, wherein the transmitted at least one visible promotional structure is visible on the mobile device (e.g., as a popup, text, icon, etc.).

Alternatively, the deployment process may include: receiving (from the recipient) approval for transmitting promotional structures; generating (in response to the approval) an email (or alternative transmittable structure such as, inter alia, a text message, a mobile phone notification, etc.) comprising the at least one visible promotional structure; and transmitting the email (or alternative transmittable structure) to the recipient before, during, or subsequent to the real time delivery process of the package.

FIG. 2C illustrates a second alternative algorithm detailing a process flow enabled by the system of FIG. 1A for improving software implemented promotional structure generation technology associated with and generating and deploying a physical or digital visible promotional structure associated with the package for delivery or a demographic profile of a package recipient, in accordance with embodiments of the present invention. Each of the steps in the algorithm of FIG. 2C may be enabled and executed in any order by a computer processor(s) executing computer code. Additionally, each of the steps in the algorithm of FIG. 2C may be enabled and executed in combination by freight carrier server 139, GUI 131, tracking system 139*a*, programming/application hardware 139*b*, shipping client systems 114, promotional entity systems 123, and recipient systems 119.

In step 235, a notification specifying package shipments available for a recipient is detected (by a freight carrier server 139) is detected from a client hardware system 114 of a client. The notification may be detected via data detection processes associated with monitoring data within data structure 250 or being transmitted across network 117. Alternatively, the notification may be detected via usage of hardware/software sensors 112 being activated during communication between freight carrier server 139 and packages of the package shipments.

In step 237, at least one profile 258 is transmitted (via a communications protocol over a data network 117 of promotional client entity hardware systems 123 located external to the server 139 and the client hardware system 114) to authorized promotional client entities. The at least one profile 258 is configured as a digital representation of electronic data. The at least one profile 258 comprises, as depicted in FIG. 1B, a recipient name and address 252*a* for the at least one recipient and descriptive data for shipments 251*c* which may include shipment data for package shipments and description data associated with the package shipments (e.g., a bar code structure, a universal product number (UPC) structure, stock keeping unit (SKU) code structure, and a radio frequency identification (RFID) structure).

In step 239, digital promotional structures cross-referenced to the at least one profile of the least one recipient are received from at least promotional client entity of the authorized promotional client entities. The digital promotional structures are stored in a data store (e.g., in the data structure 250).

In step 241, the digital promotional structures are linked to the data structure 250 that includes executable instructions embedded within computer code and the digital representation of electronic data.

In step 243, computer code of the data structure 250 is continuously updated based on results of the aforementioned steps.

In step 245, at least one visible promotional structure associated with the digital promotional structures is electronically generated for the client with respect to the recipient via the communication protocol.

In step 248, the at least one visible promotional structure is deployed (in real time) to the client such that the client is enabled to physically or digitally deploy the at least one visible promotional structure to the at least one recipient.

The deployment process of step 248 may include printing a physical packing slip comprising the at least one visible promotional structure and a contents listing for the package; and placing the physical packing slip with the package for deployment during the real time delivery process of the package to the recipient.

Alternatively, the deployment process may include: generating a digital packing slip comprising the promotional structure and a contents listing for the package; and transmitting the digital packing slip to the recipient before, during, or subsequent to a real time delivery process of the package.

As a second alternative, the deployment process may include: generating an electronic shipping notification comprising the visible promotional structure; and transmitting the electronic shipping notification to the recipient before, during, or subsequent to a real time delivery process of the package.

Figure 3:
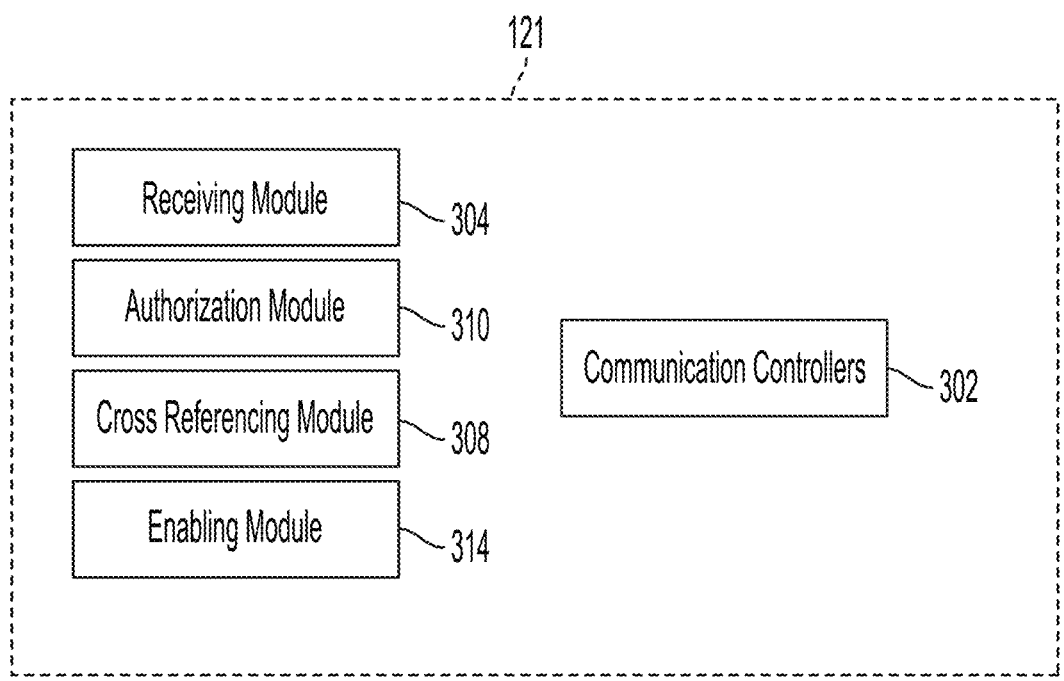
FIG. 3 illustrates an internal structural view of the software/hardware of FIG. 1, in accordance with embodiments of the present invention.

FIG. 3 illustrates an internal structural view of software/hardware 121 of FIG. 1A, in accordance with embodiments of the present invention. Software/hardware 121 includes receiving module 304, an authorization module 310, a cross-referencing module 308, an enabling module 314, and communication controllers 302. Receiving module 304 comprises specialized hardware and software for controlling all functions related to the receiving steps of FIG. 2. Authorization module 310 comprises specialized hardware and software for controlling all functionality related to the authorization steps described with respect to the algorithm of FIG. 2. Cross-referencing module 308 comprises specialized hardware and software for controlling all functions related to the cross-referencing steps of FIG. 2. Enabling module 314 comprises specialized hardware and software for controlling all functions related to the enabling and presentation steps of the algorithm of FIG. 2. Communication controllers 302 are enabled for controlling all communications between receiving module 304, authorization module 310, cross-referencing module 308, and enabling module 314.

Figure 4:
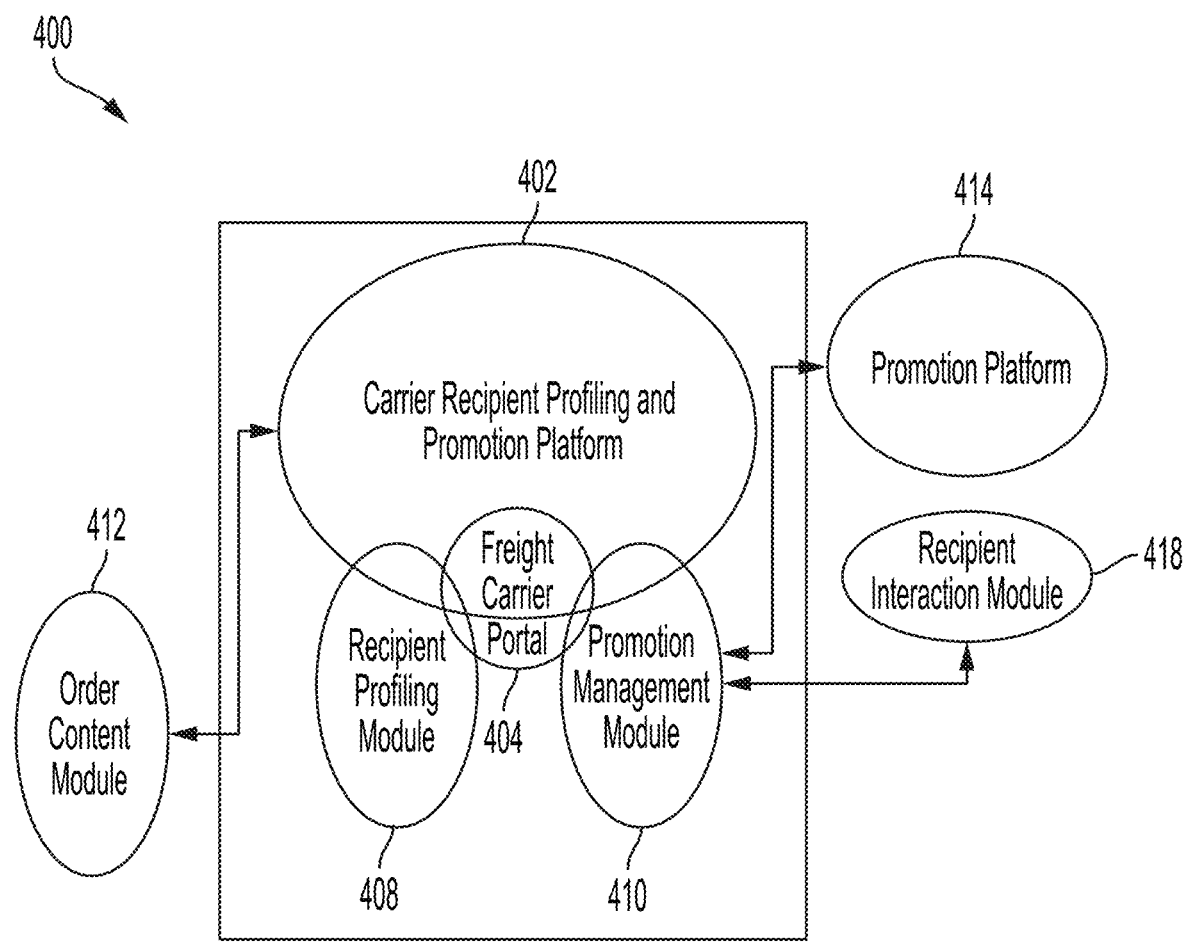
FIG. 4 illustrates a recipient order content-based demographic profiling and promotion system, in accordance with embodiments of the present invention.

FIG. 4 illustrates a recipient order content-based demographic profiling and promotion system 400, in accordance with embodiments of the present invention. System 400 comprises a carrier recipient profiling and promotion platform 402, a freight carrier portal 404, a recipient profiling module 408, a promotion management module 410, a shipping entity module 412, a promotion platform module 414, and a recipient interaction module 418. Carrier recipient profiling and promotion platform 402 is configured to store package recipient items and execute a profile process with respect to package recipients. Likewise, carrier recipient profiling and promotion platform 402 is configured to execute program code and associated rules and track recipient responses. Freight carrier recipient profiling and promotion platform 402 provides API, data, and reporting functionality for shipping entities. Freight carrier portal 404 is configured to enable a remote portal for package recipients placing orders from multiple merchants. Recipient profiling module 408 is configured to generate profiles for package recipients based on on items received from shipping clients and package recipient address related demographics. Promotion management module 410 is configured to execute a process for matching and tracking shipped orders with respect to shipping clients enabled to generate promotions. Promotion management module 410 is further configured to process promotional bids and select promotions associated with allowed orders. Likewise, promotion management module 410 is configured to control a process for applying a promotion to a package being processed on package sorters with respect to matched promotional entities. The promotion may additionally be presented with respect to an order tracking Webpage and results may be stored in a memory structure. Shipping entity module 412 is configured to provide opt-in functionality with respect to a package order, order contents, permitted promotion provision with respect to: an electronic file API, a package recipient address and name, a package order ID, and permitted or blocked promotional entities. Promotion platform module 414 is configured to provide a platform desired recipient demographic. Recipient interaction module 418 is configured to place a promotional structure on a package and present the promotion via a Web tracking age, an SMS, an email etc.

Figure 5:
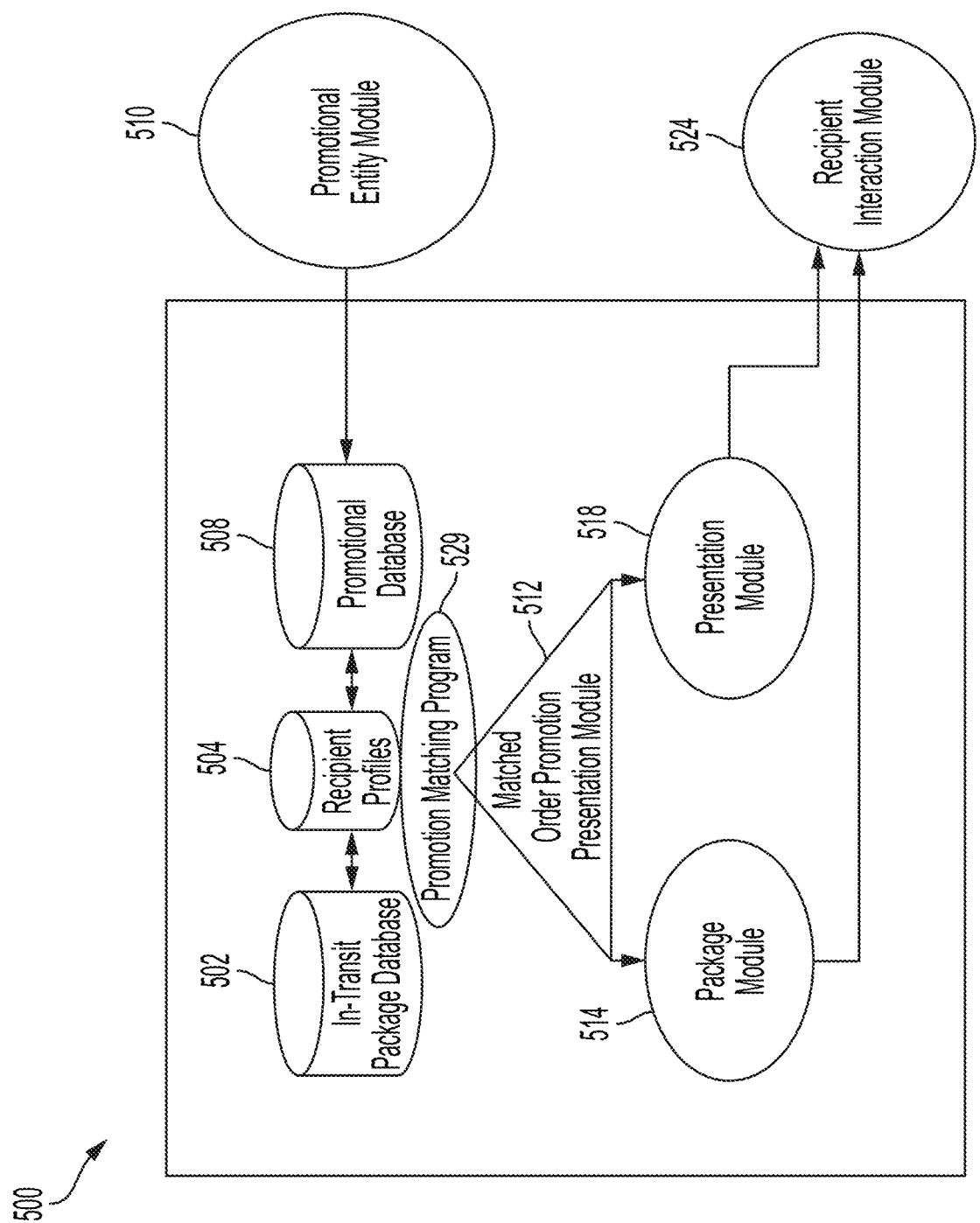
FIG. 5 illustrates a package recipient promotion generation system, in accordance with embodiments of the present invention.

FIG. 5 illustrates a package recipient promotion generation system 500, in accordance with embodiments of the present invention. System 500 comprises an in-transit package database 502 a recipient profile database 504, a promotional database 508, promotion matching program code 529, a matched order promotion presentation module 512, a package module 514, a presentation module 518, a promotional entity module 510, and a recipient interaction module 524. In-transit package database 502 is configured to store data describing in-transit packages being shipped via a freight carrier entity. Each of the packages is associated with at least one promotional entity. Recipient profile database 504 is configured to store package recipient profiles. Promotion matching program code 529 comprises software code configured to control all functionality of system 500. Promotional database 508 is enabled for storing desired package recipient profiles, an associated quantity of packages delivered, price offers for packages, and package order time windows. Matched order promotion presentation module 512 is configured to control all functionality associated with matching promotions with package orders. Package module 514 is configured to control functionality for applying a physical promotional structure (e.g., a label such as a visible promotion or a QR code, a RFID tag etc. The physical promotional structure may be applied to the package at a specified location on the package. Package module 514 may be further configured to track a package physically to a label printer or to a QR code or RFID tag programming unit. Presentation module 518 is configured to present a specified promotion to a package recipient via, inter alia, a Web based tracking Page, a SMS, an email, etc. Promotional entity module 510 may be associated with a shipping entity. Alternatively, promotional entity module 510 may be associated with a non-shipping entity. Promotional entity module 510 is configured to provide a specified recipient demographic, a quantity of packages for delivery, a package delivery time window, a price or bid per promotion, current customer IDs, etc. Recipient interaction module 524 is configured to control and monitor package recipient interaction with physical and digital promotional structures.

Carriers utilizing carrier-related ad platforms may collaborate with other digital ad platforms such as Google®, Facebook, Amazon®, etc. by providing recipient demographic profiles in whole or in part to the other digital ad platforms to further improve the demographic targeting of ads served on the other digital ad platforms. The recipient demographic profiles may be provided directly by the carrier or via the carrier-related ad platforms. Conversely, the carrier-related ad platforms may combine data provided by the other digital ad platforms through a common demographic profile ad ID such as email or address or device IDs used by the profile.

Carriers such as FedEx® and UPS may form a common database or submit respective recipient demographic or other recipient information to a third party database to form a unified demographic profiling database and platform which all participating carriers can share when providing recipient demographic profiles to advertisers. The unified demographic profiling database and platform includes unified demographic recipient profiles of recipients. For example, a particular unified demographic recipient profile of a particular recipient may be from data provided by multiple participating carriers and/or by vendors selling items to the particular participant. When one carrier has an in-transit parcel being sent to the particular recipient, that one carrier may use the unified demographic recipient profile of the particular recipient to present to potential advertisers.

Figure 6:
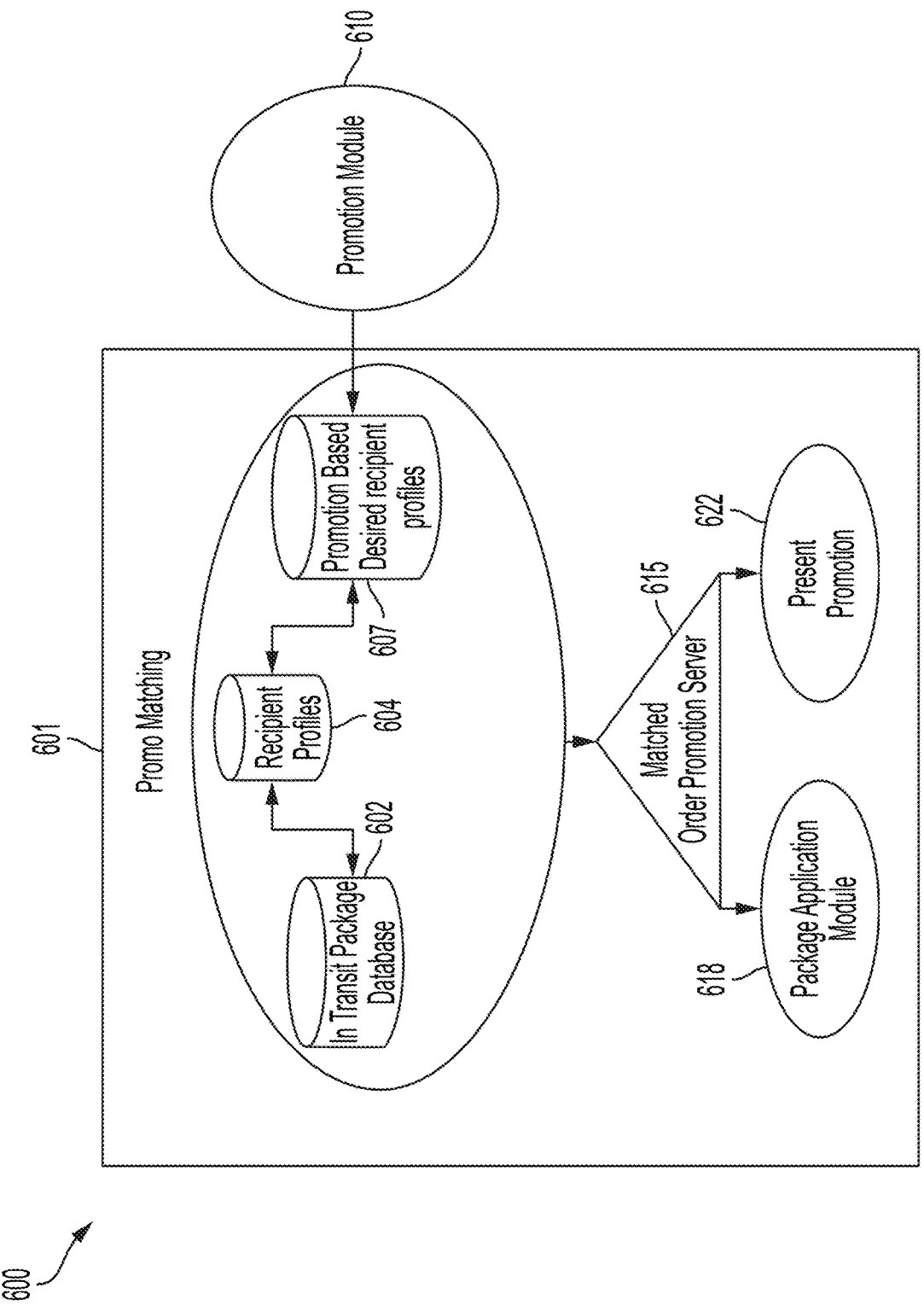
FIG. 6 illustrates cross-referencing system, in accordance with embodiments of the present invention.

FIG. 6 illustrates a cross-referencing system 600, in accordance with embodiments of the present invention. System 600 comprises an in-transit package database 602, a recipient profile database 604, a promotional recipient database 607, a matched order promotion server module 615, a package application module 618, a presentation module 622, and a promotion module 610. In-transit package database 602 is configured to store data describing in-transit packages being shipped via a freight carrier entity. The data may include, inter alia, package identification for packages pending a freight carrier sort process, etc. Recipient profile database 604 is configured to store package recipient profiles. Promotional recipient database 607 is configured for storing desired package recipient profiles, an associated quantity of packages delivered, price offers for packages, and package order time windows. In-transit package database 602, recipient profile database 604, and promotional recipient database 607 are configured to (in combination) provide input for executing a process for matching in-transit package recipients with established recipient profiles with respect to a package delivery stage. Likewise, desired recipient profiles are matched with in-transit package recipient profiles of package recipients that are not associated with a desired promotional entity. The matching process enables a process for promotional entity bidding with respect to available matching promotional structure package placement. Matched order promotion server 615 is configured to control all functionality associated with matching promotions with package orders. Package application module 618 is configured to control functionality for applying a physical promotional structure (e.g., a label such as a visible promotion or a QR code, a RFID tag etc. The physical promotional structure may be applied to the package at a specified location on the package. Package application module 618 may be further configured to track a package physically to a label printer or a QR code or RFID tag programming unit. Presentation module 622 is configured to present a specified promotion to a package recipient via, inter alia, a Web based tracking Page, a SMS, an email, etc. Promotion module 610 may be associated with a shipping entity. Alternatively, promotion module 610 may be associated with a non-shipping entity. Promotion module 610 is configured to provide a specified recipient demographic, a quantity of packages for delivery, a package delivery time window, a price or bid per promotion, current customer IDs, etc.

Figure 7:
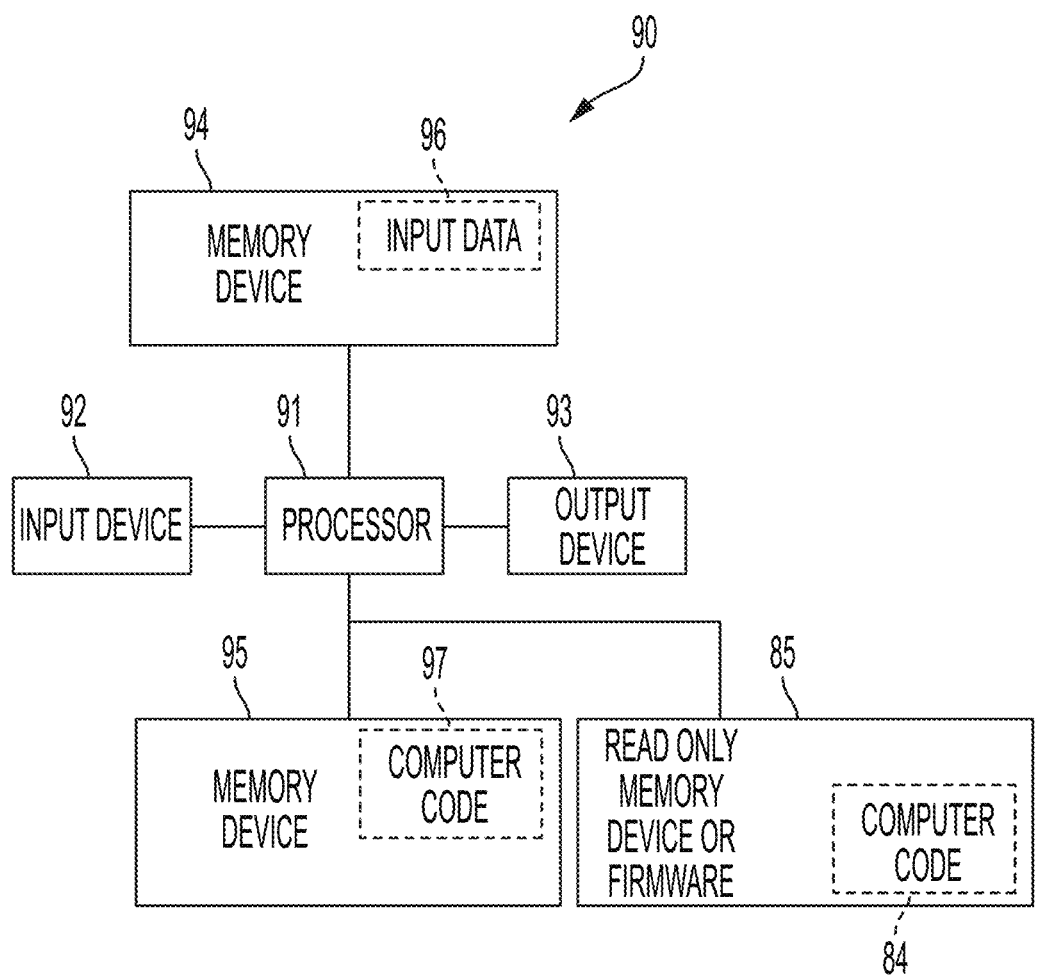
FIG. 7 illustrates a computer system used by the system of FIG. 1A for improving software implemented promotional structure generation technology associated with receiving electronic data comprising shipment identification data for a shipment of an item, authorizing a shipping client associated with freight carrier to generate visible promotional structures associated with specified packages, and generating and presenting a physical or digital visible promotional structure associated with the package for delivery or a demographic profile of a package recipient, in accordance with embodiments of the present invention.

FIG. 7 illustrates a computer system 90 (e.g., freight carrier server 139, tracking system 139a, programming/application hardware 139b, shipping client systems 114, promotional entity systems 123, and/or recipient systems 119 of FIG. 1A) used by or comprised by the system 100 of FIG. 1A for improving software implemented promotional structure generation technology associated with receiving electronic data comprising shipment identification data for a shipment of an item, authorizing a shipping client associated with freight carrier to generate visible promotional structures associated with specified packages, and generating and presenting a physical or digital visible promotional structure associated the package for delivery or a demographic profile of a package recipient, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 7 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving software implemented promotional structure generation technology associated with receiving electronic data comprising shipment identification data for a shipment of an item, authorizing a shipping client associated with freight carrier to generate visible promotional structures associated with specified packages, and generating and presenting a physical or digital visible promotional structure associated the package for delivery or a demographic profile of a package recipient. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A server of a system comprising a processor coupled to a computer-readable memory unit, the memory unit comprising instructions that when executed by the processor implements an electronically generated promotion configuration and deployment method, said method comprising:

cross referencing with respect to a recipient demographic profile of at least one package recipient, by the processor, promotional attributes with the at least one package recipient, wherein the recipient demographic profile comprises one or more items selected from the group consisting of a category of purchases by the at least one package recipient, a frequency of purchases by the at least one package recipient, a value of purchases by the at least one package recipient, an estimated home value of the at least one package recipient, an estimated income of the at least one package recipient, address data of the at least one package recipient, time series and rate of change data associated with the at least one package recipient, responses by the at least one package recipient with respect to previous promotions, specific types, quantities, or combinations of items or categories of items purchases/received over time by the at least one package recipient, responses by the at least one package recipient to previous digital promotions unrelated to current package shipments, and combinations thereof;

electronically generating, by the processor for the client with respect to the at least one package recipient, at least one visible promotional structure associated with the promotional attributes;

embedding, by the processor, the at least one visible promotional structure within a communication to be presented to said at least one package recipient, wherein the communication is selected from the group consisting of a Web-based tracking page that tracks shipment of at least one package, an email, and a Short Messaging Service (SMS) text message; and deploying, by the processor to a destination associated with the at least one package recipient, the at least one visible promotional structure to the at least one package recipient, said destination being selected from the group consisting of a user interface receiving package tracking number-associated information, an email address of the at least one package recipient, and a device of the at least one package recipient receiving a digital communication.

2. The server of claim 1, wherein the recipient attributes comprise a detected current location of the at least one recipient.

3. The server of claim 1, wherein the recipient attributes comprise a detected previous location of the at least one recipient.

4. The server of claim 1, said method further comprising:
deploying the at least one visible promotional structure with at least one package, but not attached to the at least one package, during a delivery process of the at least one package to the at least one package recipient.

5. The server of claim 1, said method further comprising:
deploying the at least one visible promotional structure independently with respect to at least one package during a delivery process of the at least one package to said at least one package recipient.

6. The server of claim 1, said method further comprising:
generating the email comprising the at least one visible promotional structure embedded within the email; and
transmitting the email to the hardware device of the at least one package recipient for presentation to the at least one package recipient via a hardware and software user interface.

7. The server of claim 1, said method further comprising:
transmitting, by the processor to a mobile device of the at least one package recipient, the at least one visible promotional structure, wherein the transmitted at least one visible promotional structure is visible on the mobile device.

8. The server of claim 1, wherein the system is a system of a freight carrier entity.

9. The server of claim 1, wherein the system is a system of a shipping client associated with a freight carrier entity.

10. An electronically generated promotion configuration and deployment method, said method comprising:
cross referencing with respect to a recipient demographic profile of at least one package recipient, by the processor, promotional attributes from a client with the at least one package recipient, wherein the recipient demographic profile comprises one or more items selected from the group consisting of a category of purchases by the at least one package recipient, a frequency of purchases by the at least one package recipient, a value of purchases by the at least one package recipient, an estimated home value of the at least one package recipient, an estimated income of the at least one package recipient, address data of the at least one package recipient, time series and rate of change data associated with the at least one package recipient, responses by the at least one package recipient with respect to previous promotions, specific types, quantities, or combinations of items or categories of items purchases/received over time by the at least one package recipient, responses by the at least one package recipient to previous digital promotions unrelated to current package shipments, and combinations thereof;
electronically generating, by the processor for the client with respect to the at least one package recipient, at least one visible promotional structure associated with the promotional attributes;
embedding, by the processor, the at least one visible promotional structure within a communication to be presented to said at least one package recipient, wherein the communication is selected from the group consisting of a Web-based tracking page that tracks shipment of at least one package, an email, and a Short Messaging Service (SMS) text message; and
deploying, by the processor to a destination associated with the at least one package recipient, the at least one visible promotional structure to the at least one package recipient, said destination being selected from the group consisting of a user interface receiving package tracking number-associated information, an email address of the at least one package recipient, and a device of the at least one package recipient receiving a digital communication.

11. The method of claim 10, wherein the recipient attributes comprise a detected current location of said at least one recipient.

12. The method of claim 10, wherein the recipient attributes comprise a detected previous location of said at least one recipient.

13. The method of claim 10, said method further comprising:
deploying the at least one visible promotional structure with at least one package, but not attached to the at least one package, during a delivery process of the at least one package to the at least one package recipient.

14. The method of claim 13, said method further comprising:
deploying the at least one visible promotional structure independently with respect to the at least one package during the real time delivery process of said at least one package to said at least one package recipient.

15. The method of claim 10, said method further comprising:
generating the email comprising the at least one visible promotional structure embedded within the email; and
transmitting the email to the hardware device of the at least one package recipient for presentation to the at least one package recipient via a hardware and software user interface.

16. The method of claim 10, wherein the system is a system of a freight carrier entity.

17. The method of claim 10, wherein the system is a system of a shipping client associated with a freight carrier entity.

18. A server of a system comprising a processor coupled to a computer-readable memory unit, the memory unit comprising instructions that when executed by the processor implements an electronically generated promotion configuration and deployment method, said method comprising:
cross referencing with respect to a recipient demographic profile of at least one package recipient, by the processor, digital promotional structures profile with the at least one package recipient, wherein the recipient demographic profile is configured as a digital representation of electronic data, and wherein the recipient demographic profile comprises one or more items selected from the group consisting of a category of purchases by the at least one package recipient, a frequency of purchases by the at least one package recipient, a value of purchases by the at least one package recipient, an estimated home value of the at least one package recipient, an estimated income of the at least one package recipient, address data of the at least one package recipient, time series and rate of change data associated with said at least one package recipient, responses by the at least one package recipient with respect to previous promotions, specific types, quantities, or combinations of items or categories of items purchases/received over time by the at least one package recipient, responses by the at least one package recipient to previous digital promotions unrelated to current package shipments, and combinations thereof;
linking, by the processor, the digital promotional structures to a data structure comprising executable instructions embedded within computer code and the digital representation of electronic data;
continuously updating, by the processor, the computer code of the data structure;
electronically generating, by the processor for the client with respect to the at least one package recipient, at least one visible promotional structure associated with the digital promotional structures;
embedding, by the processor, the at least one visible promotional structure within a communication to be presented to said at least one package recipient, wherein the communication is selected from the group consisting of a Web-based tracking page that tracks shipment of at least one package, an email, and a Short Messaging Service (SMS) text message; and
deploying, by the processor to a destination associated with the at least one package recipient, the at least one visible promotional structure to the at least one package recipient, said destination being selected from the group consisting of a user interface receiving package tracking number-associated information, an email address of the at least one package recipient, and a device of the at least one package recipient receiving a digital communication.

19. The server of claim 18, said method further comprising:
printing a physical packing slip comprising the at least one visible promotional structure and a contents listing for at least one package; and
placing the physical packing slip with the at least one package, but not attached to the at least one package, for delivery of the at least one package to the at least one package recipient.

20. The server of claim 18, said method further comprising:
generating a digital packing slip comprising the at least one visible promotional structure and a contents listing for at least one package; and
transmitting the digital packing slip to the at least one package recipient before, during, or subsequent to a delivery of the at least one package to the at least one package recipient.

21. The server of claim 18, said method further comprising:
generating an electronic shipping notification comprising the at least one visible promotional structure; and
transmitting the electronic shipping notification to the at least one package recipient before, during, or subsequent to a delivery of the at least one package to the at least one package recipient.

22. The server of claim 18, wherein the system is a system of a freight carrier entity.

23. The server of claim 18, wherein the system is a system of a shipping client associated with a freight carrier entity.

24. A server of a system comprising a processor coupled to a computer-readable memory unit, the memory unit comprising instructions that when executed by the processor implements an electronically generated promotion configuration and deployment method, said method comprising:
associating an identifier (ID) of a mobile device of at least one package recipient to a data structure;
cross referencing with respect to a recipient demographic profile of at the least one package recipient, by the processor, promotional attributes with the at least one package recipient, wherein recipient attributes of the at least one package recipient are included within a data structure, wherein the data structure includes a digital representation of electronic data comprising the mobile device ID and the recipient demographic profile, and wherein the recipient demographic profile comprises one or more items selected from the group consisting of a category of purchases by the at least one package recipient, a frequency of purchases by the at least one package recipient, a value of purchases by the at least one package recipient, an estimated home value of the at least one package recipient, an estimated income of the at least one package recipient, address data of the at least one package recipient, time series and rate of change data associated with the at least one package recipient, responses by the at least one package recipient with respect to previous promotions, specific types, quantities, or combinations of items or categories of items purchases/received over time by the at least one package recipient, responses by the at least one package recipient to previous digital promotions unrelated to current package shipments, and combinations thereof;
electronically generating, by the processor for the client with respect to the at least package recipient, at least one visible promotional structure associated with the promotional attributes;
embedding, by the processor, the at least one visible promotional structure within a communication to be presented to said at least one package recipient, wherein the communication is selected from the group consisting of a Web-based tracking page that tracks shipment of at least one package being shipped, an email, and a Short Messaging Service (SMS) text message; and
deploying, by the processor to the mobile device of the at least one package recipient, the at least one visible promotional structure, wherein the at least one visible promotional structure is visible on the mobile device of the at least one recipient.

25. The server of claim 24, said method further comprising:
associating, by the processor, an address at least one recipient to the mobile device ID of the at least one recipient.

26. The server of claim 24, wherein said electronically generating the at least one visible promotional structure is based on one or more data items in the data structure.

27. The server of claim 26, wherein the one or more data items in the data structure, upon which said electronically generating the at least one visible promotional structure is based, comprises a past and/or current location of the mobile device, one or more advertisements that the at least one package recipient has responded to, one or more categories of goods and services that the at least one package recipient has responded to, or combinations thereof.

28. The server of claim 24, said method further comprising:
deploying, by the processor to a user interface receiving package tracking number-associated information, the at least one visible promotional structure.

29. The server of claim 24, said method further comprising:
deploying, by the processor to an email address of the at least one package recipient, the at least one visible promotional structure.

30. The server of claim 24, wherein the system is a system of a freight carrier entity.

31. The server of claim 24 wherein the system is a system of a shipping client associated with a freight carrier entity.

* * * * *